United States Patent
Matsumoto et al.

(10) Patent No.: US 9,549,097 B2
(45) Date of Patent: Jan. 17, 2017

(54) IMAGING DEVICE, IMAGE FORMING APPARATUS, AND METHOD OF CONTROLLING DRIVING OF TWO-DIMENSIONAL IMAGE SENSOR

(71) Applicants: Hiroshi Matsumoto, Kanagawa (JP); Nobuyuki Satoh, Kanagawa (JP); Mamoru Yorimoto, Kanagawa (JP); Masato Kobayashi, Kanagawa (JP); Masayuki Fujii, Kanagawa (JP); Satoshi Hirata, Kanagawa (JP)

(72) Inventors: Hiroshi Matsumoto, Kanagawa (JP); Nobuyuki Satoh, Kanagawa (JP); Mamoru Yorimoto, Kanagawa (JP); Masato Kobayashi, Kanagawa (JP); Masayuki Fujii, Kanagawa (JP); Satoshi Hirata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/565,182

(22) Filed: Dec. 9, 2014

(65) Prior Publication Data
US 2015/0248597 A1 Sep. 3, 2015

(30) Foreign Application Priority Data

Dec. 11, 2013 (JP) .................................. 2013-256474
Oct. 7, 2014 (JP) .................................. 2014206657

(51) Int. Cl.
*H04N 1/60* (2006.01)
*H04N 1/48* (2006.01)
*H04N 1/401* (2006.01)

(52) U.S. Cl.
CPC ................ *H04N 1/60* (2013.01); *H04N 1/401* (2013.01); *H04N 1/48* (2013.01)

(58) Field of Classification Search
None
See application file for complete search history.

(56) References Cited

U.S. PATENT DOCUMENTS

| 5,260,774 A | * | 11/1993 | Takayama | ............... | H04N 9/735 348/223.1 |
| 2006/0062427 A1 | * | 3/2006 | Burkhart | ............ | G06K 9/00449 382/100 |
| 2008/0055673 A1 | * | 3/2008 | Sorgius | .................... | H04N 1/12 358/474 |

(Continued)

FOREIGN PATENT DOCUMENTS

JP   2012-063270   3/2012

*Primary Examiner* — Fan Zhang
(74) *Attorney, Agent, or Firm* — Duft Bornsen & Fettig LLP

(57) ABSTRACT

An imaging device comprises: a two-dimensional image sensor that includes a plurality of light receiving units capable of reading an output value individually according to a volume of received light thereof; a receiving unit that receives a control signal that specifies an operation mode of the two-dimensional image sensor that is predetermined according to a purpose of using the output value; and a sensor controller that sets, on the basis of the control signal received by the receiving unit, an imaging area representing an area of a light receiving unit that reads the output value from among the light receiving units of the two-dimensional image sensor and controls reading of the output value.

11 Claims, 26 Drawing Sheets

(56) References Cited

U.S. PATENT DOCUMENTS

| | | |
|---|---|---|
| 2012/0069411 A1 | 3/2012 | Satoh et al. |
| 2012/0236308 A1 | 9/2012 | Satoh |
| 2013/0027720 A1 | 1/2013 | Satoh |
| 2013/0027721 A1 | 1/2013 | Kobayashi et al. |
| 2013/0135484 A1 | 5/2013 | Satoh et al. |
| 2013/0208289 A1 | 8/2013 | Satoh et al. |
| 2013/0229671 A1 | 9/2013 | Yokozawa et al. |
| 2013/0242319 A1 | 9/2013 | Suzuki et al. |
| 2013/0242320 A1 | 9/2013 | Suzuki et al. |
| 2013/0242321 A1 | 9/2013 | Okada et al. |
| 2013/0242361 A1 | 9/2013 | Matsumoto et al. |
| 2013/0258364 A1* | 10/2013 | Ito ................ H04N 1/603 358/1.9 |
| 2013/0258368 A1 | 10/2013 | Shigemoto et al. |
| 2013/0258369 A1 | 10/2013 | Suzuki et al. |
| 2014/0184680 A1* | 7/2014 | Writt ............... B41J 2/2135 347/14 |
| 2015/0249764 A1* | 9/2015 | Nakatani ......... G03G 15/0131 358/1.5 |

\* cited by examiner

| PATCH NUMBER | DEFAULT REFERENCE RGB VALUES (RdGdBd) | | | Ld | ad | bd | Xd | Yd | Zd |
|---|---|---|---|---|---|---|---|---|---|
| | Rd | Gd | Bd | | | | | | |
| 1 | 3 | 8 | 5 | 6 | 7 | 2 | | | |
| 2 | | | | | | | | | |
| 3 | | | | | | | | | |
| ... | | | | | | | | | |
| ... | | | | | | | | | |
| | | | | | | | | | |
| ... | | | | | | | | | |
| 72 | | | | | | | | | |

Tb1S

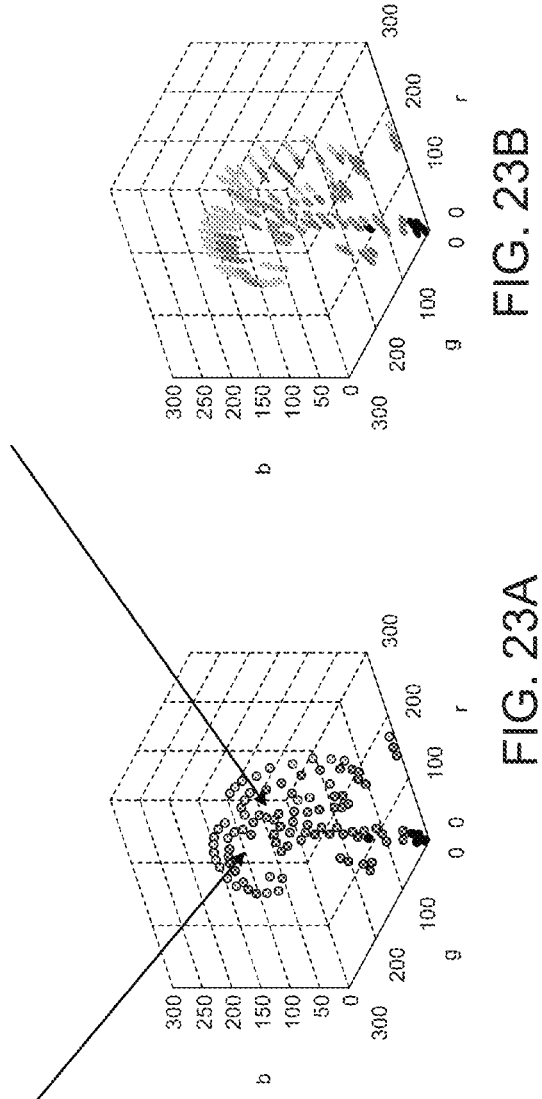

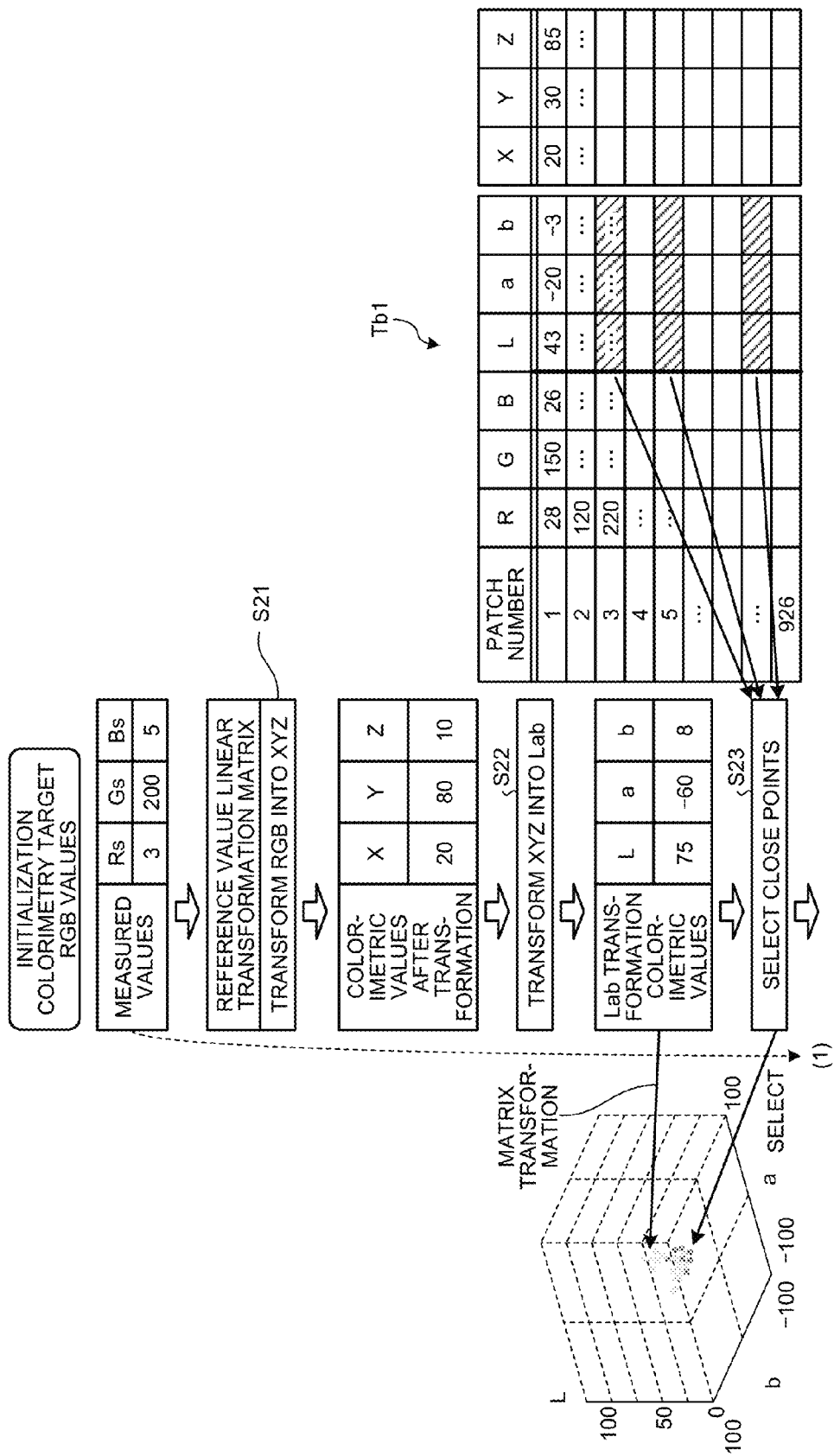

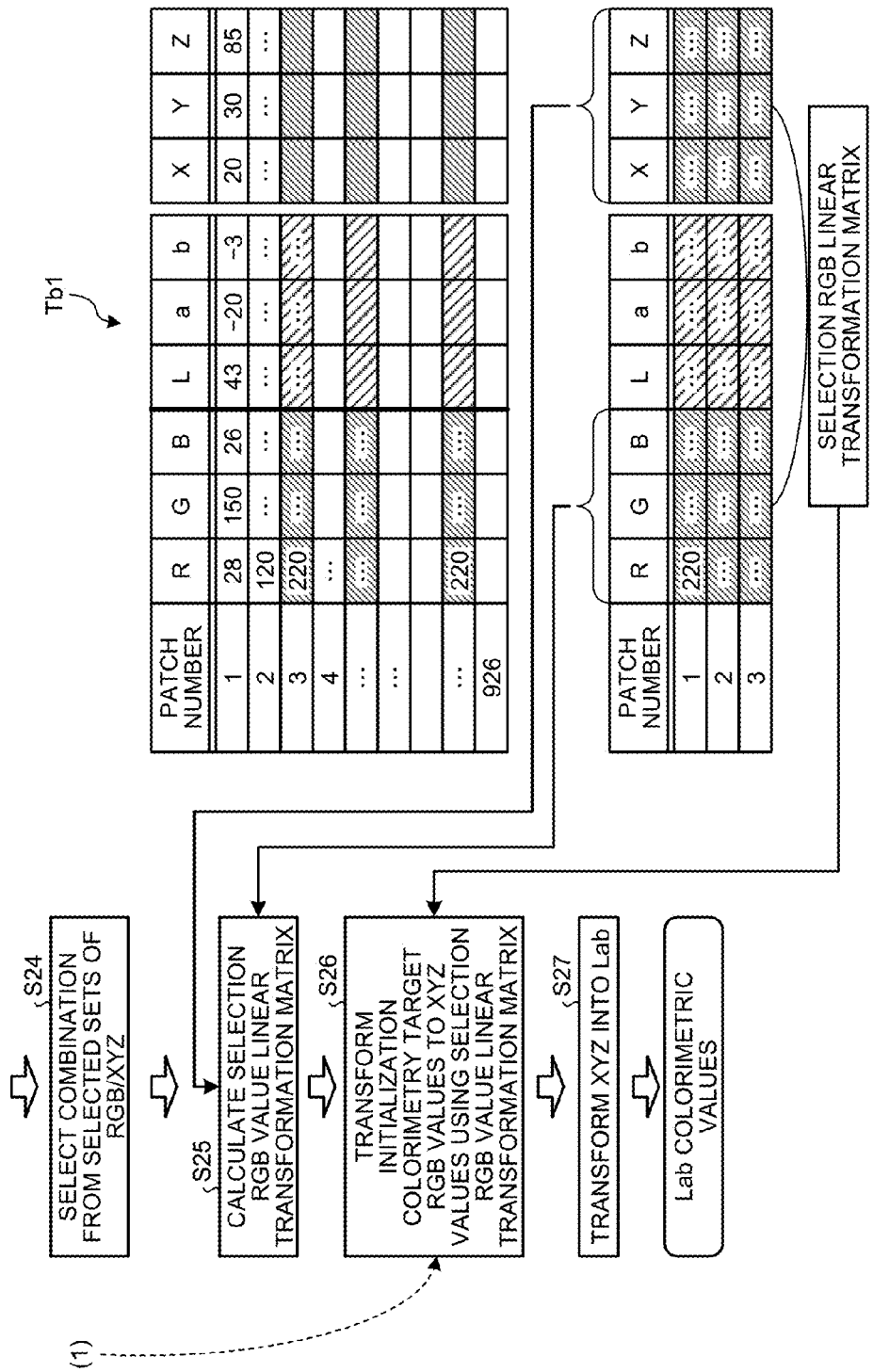

IMAGING DEVICE, IMAGE FORMING APPARATUS, AND METHOD OF CONTROLLING DRIVING OF TWO-DIMENSIONAL IMAGE SENSOR

CROSS-REFERENCE TO RELATED APPLICATIONS

The present application claims priority to and incorporates by reference the entire contents of Japanese Patent Application No. 2013-256474 filed in Japan on Dec. 11, 2013 and Japanese Patent Application No. 2014-206657 filed in Japan on Oct. 7, 2014.

BACKGROUND OF THE INVENTION

1. Field of the Invention

The present invention relates to an imaging device, an image forming apparatus, and a method of controlling driving of a two-dimensional image sensor.

2. Description of the Related Art

A conventional image forming apparatus with a function of printing a test pattern on a printing paper sheet and of color-measuring patches contained in the test pattern (see, Japanese Laid-open Patent Publication No. 2012-63270). The image forming apparatus described in Japanese Laid-open Patent Publication No. 2012-63270 performs colorimetry on the patches by imaging each patch contained in the test pattern using a two-dimensional image sensor and then transforming the RGB values thus obtained to color values in a standard color space. Using the colorimetric values of the patches, color calibration on the image forming apparatus is performed. Color calibration on the image forming apparatus can be performed also by using the RGB values of the patches obtained by the imaging with the two-dimensional image sensor.

It is expected that two-dimensional image sensors are used for, in addition to imaging of patches, various uses that are required as functions of the image forming apparatus. For example, the two-dimensional image sensor can be used for, for example, a function of detecting image misalignment or a function of detecting the end of a paper sheet. However, in the conventional technology, because it takes time for the two-dimensional image sensor to read output values, efficient use of the two-dimensional image sensor is limited.

In view of the above-described circumstances, there is a need to provide an imaging device, an image forming apparatus, and a method of controlling driving of a two-dimensional image sensor that perform control such that a two-dimensional image sensor can be efficiently used for much more uses.

SUMMARY OF THE INVENTION

It is an object of the present invention to at least partially solve the problems in the conventional technology.

According to the present invention, there is provided an imaging device comprising: a two-dimensional image sensor that includes a plurality of light receiving units capable of reading an output value individually according to a volume of received light thereof; a receiving unit that receives a control signal that specifies an operation mode of the two-dimensional image sensor that is predetermined according to a purpose of using the output value; and a sensor controller that sets, on the basis of the control signal received by the receiving unit, an imaging area representing an area of a light receiving unit that reads the output value from among the light receiving units of the two-dimensional image sensor and controls reading of the output value.

The present invention also provides an image forming apparatus comprising: a printing unit that prints an image on a printing medium; a two-dimensional image sensor that includes a plurality of light receiving units capable of reading an output value individually according to a volume of received light thereof; an arithmetic logic unit that performs any one of colorimetry on the image printed on the printing medium and detection of a position relating to printing; and a sensor controller that sets, according to a purpose of using the output value, an imaging area representing an area of a light receiving unit that reads the output value from among the light receiving units of the two-dimensional image sensor and controls reading of the output value.

The present invention also provides a method of controlling driving of a two-dimensional image sensor that includes a plurality of light receiving units capable of reading an output value individually according to a volume of received light thereof, the method comprising: setting, according to a purpose of using the output value, an imaging area representing an area of a light receiving unit that reads the output value from among the light receiving units of the two-dimensional image sensor; and controlling reading of the output value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 23(a) and 23(b) are diagrams illustrating the relationship between the default reference RGB values and colorimetry reference RGB values;

FIG. 24 is a diagram illustrating basic colorimetric processing; and

FIG. 25 is a diagram illustrating the basic colorimetric processing.

DETAILED DESCRIPTION OF THE PREFERRED EMBODIMENTS

An imaging device, an image forming apparatus, and a method of controlling driving of a two-dimensional image sensor according to an embodiment of the present invention will be described in detail below with reference to the accompanying drawings. In the embodiment to be described below, an inkjet printer will be descried as an exemplary image forming apparatus to which the present invention is applied. However, the present invention is not limited to this. For example, the present invention can be widely applied to various types of image forming apparatuses, such as an image forming apparatus that prints an image by electrographic processing.

Mechanical Configuration of Image Forming Apparatus

Figure 1:
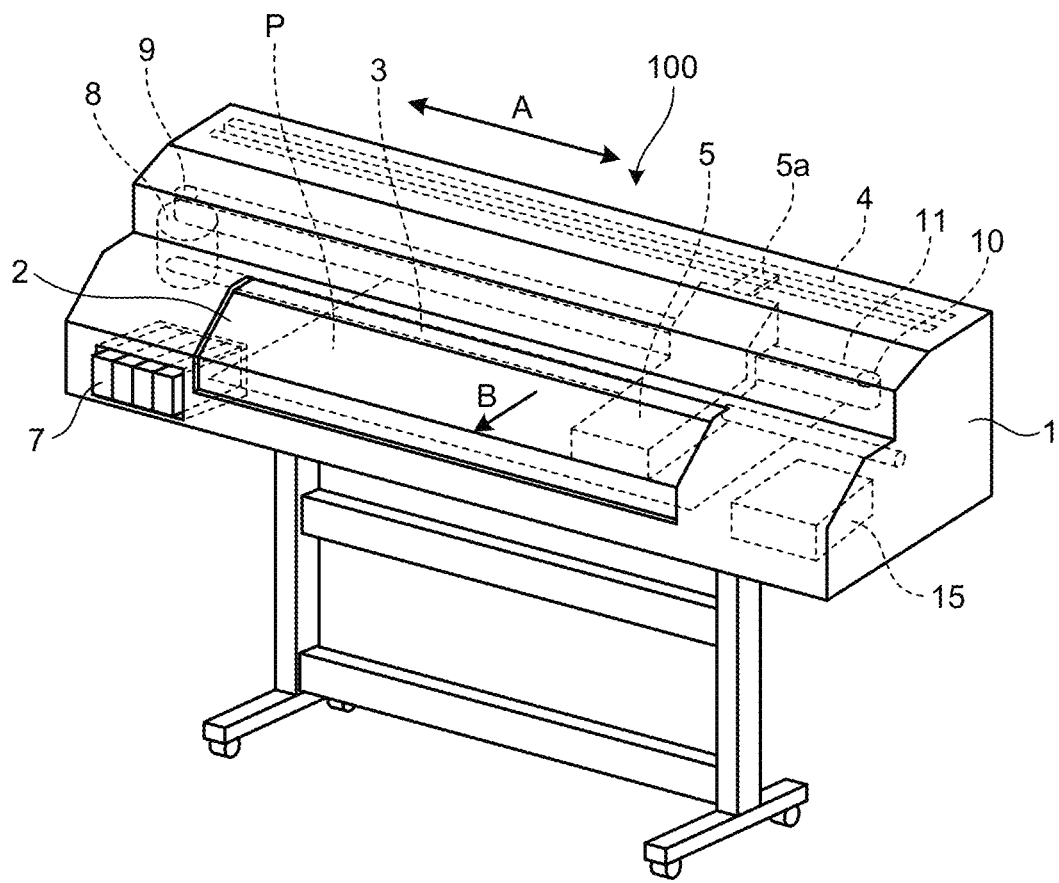
FIG. 1 is a transparent internal perspective view of an image forming apparatus.
Figure 2:
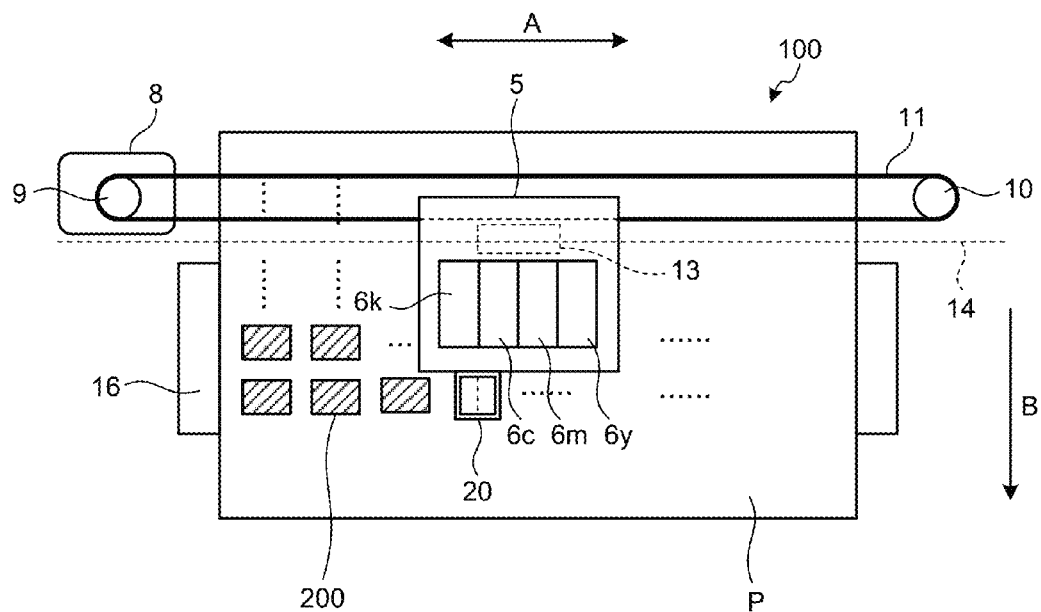
FIG. 2 is a top view of an internal mechanical configuration of the image forming apparatus.
Figure 3:
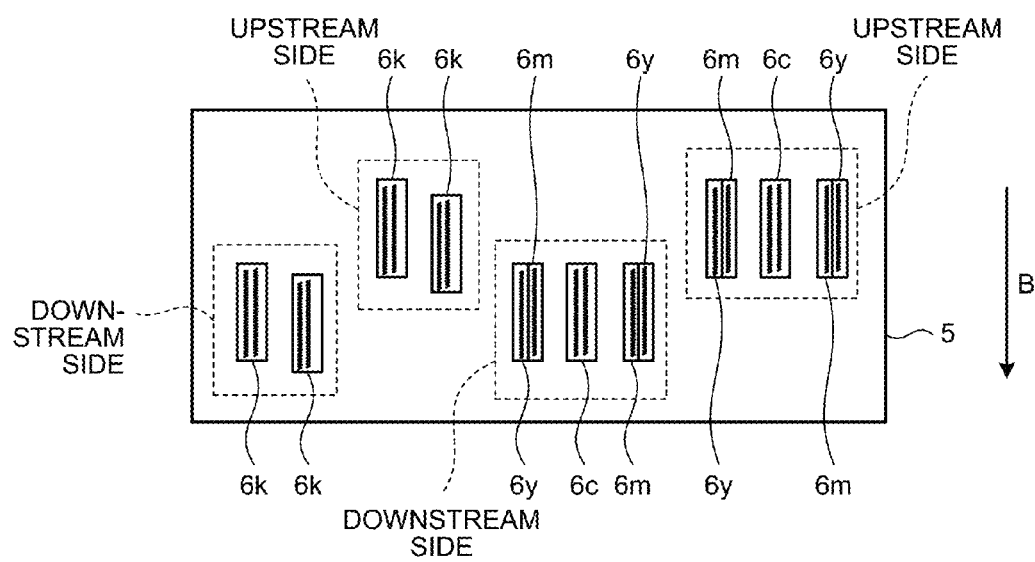
FIG. 3 is a diagram illustrating exemplary disposition of recording heads mounted on a carriage.

With reference to FIGS. 1 to 3, a mechanical configuration of an image forming apparatus 100 according to the embodiment will be described first. FIG. 1 is a transparent internal perspective view of the image forming apparatus 100, FIG. 2 is a top view of an internal mechanical configuration of the image forming apparatus 100, and FIG. 3 is a diagram illustrating exemplary disposition of recording heads 6 mounted on a carriage 5.

As shown in FIG. 1, the image forming apparatus 100 includes the carriage (support member) 5 that reciprocates in the main-scanning direction (in the directions of the arrows denoted with A). The carriage 5 is supported by a main guide rod 3 that is provided as extending along the main-scanning direction. A connecting member 5a is provided to the carriage 5. The connecting member 5a engages with a sub guide member 4 that is provided parallel to the main guide rod 3, thereby stabilizing the posture of the carriage 5.

As shown in FIG. 2, four recording heads 6y, 6m, 6c, and 6k are mounted on the carriage 5. The recording head 6y is a recording head that ejects yellow (Y) ink. The recording head 6m is a recording head that ejects magenta (M) ink. The recording head 6c is a recording head that ejects cyan (C) ink. The recording heads 6k are multiple recording heads that eject black (Bk) ink. The recording heads 6y, 6m, 6c, and 6k are collectively referred to as the recording head 6 below. The recording head 6 is supported by the carriage 5 such that the ejection surface (nozzle surface) of the recording head 6 faces down (faces a paper sheet P).

A cartridge 7 that is an ink supplier for supplying ink to the recording head 6 is not mounted on the carriage 5 but disposed in a given position in the image forming apparatus 100. The cartridge 7 and the recording head 6 are connected with a pipe (not shown) and ink is supplied from the cartridge 7 to the recording head 6 via the pipe.

The carriage 5 is connected to a timing belt 11 that extends between a drive pulley 9 and a driven pulley 10. Driving a main scanning motor 8 causes the drive pulley 9 to rotated. The driven pulley 10 has a mechanism for adjusting the distance between the driven pulley 10 and the drive pulley 9 and has a role of applying a given tension to the timing belt 11. The carriage 5 reciprocates in the main-scanning direction as the timing belt 11 is run by driving the main scanning motor 8. The move of the carriage 5 in the main-scanning direction is controlled, for example, as shown in FIG. 2, on the basis of the encoder value obtained by an encoder sensor 13 provided to the carriage 5 by detecting the mark on an encoder sheet 14.

The image forming apparatus 100 of the embodiment includes a maintenance mechanism 15 for maintaining the reliability of the recording head 6. The maintenance mechanism 15 cleans the ejection surface of the recording head 6, caps the recording head 6, and ejects unnecessary ink from the recording head 6.

As shown in FIG. 2, a platen 16 is provided at a position facing the ejection surface of the recording head 6. The platen 16 is for supporting a paper sheet P when ink is ejected from the recording head 6 onto the paper sheet P. The image forming apparatus 100 according to the embodiment is a wide machine in which the carriage 5 moves a long distance in the main-scanning direction. For this reason, the platen 16 is configured by connecting multiple flat members in the main-scanning direction (in the direction in which the carriage 5 moves). The paper sheet P is held between conveying rollers that are driven by a sub scanning motor (not shown) and is intermittently conveyed on the platen 16 in the sub-scanning direction.

The recording head 6 includes multiple rows of nozzles and ejects ink from the nozzle rows onto the paper sheet P that is conveyed on the platen 16, so that an image is printed on the paper sheet P. In the embodiment, in order to secure a wider image width that can be printed per scanning by the carriage 5, the recording head 6 on the upstream side and the recording head 6 on the downstream side are mounted on the carriage 5. The number of recording heads 6k that eject black ink and that is mounted on the carriage 5 is twice as that of the recording heads 6y, 6m, and 6c that eject color ink. The recording heads 6y and 6m are arranged separately on the right and left in order to adjust the order in which colors are superimposed in the reciprocation of the carriage 5 to prevent the color from changing between the out-bound and in-bound. The disposition of the recording heads 6 shown in FIG. 3 is an example only and disposition of the recording heads 6 is not limited to the one shown in FIG. 3.

Each of the above-described components of the image forming apparatus 100 of the embodiment is disposed in the inside of an exterior covering 1. A cover member 2 is openably provided to the exterior covering 1. When maintenance of the image forming apparatus 100 is performed or when paper jam occurs, by opening the cover member 2, work can be performed on each component provided in the inside of the exterior covering 1.

The image forming apparatus 100 of the embodiment conveys the paper sheet P intermittently in the sub-scanning direction (in the direction denoted by the arrow B shown in the drawings) and, while transferring of the paper sheet P in the sub-scanning direction is being stopped, ejects ink from the nozzle rows of the recording head 6 mounted on the carriage 5 onto the paper sheet P on the platen 16 while moving the carriage 5 in the main-scanning direction, so that an image is printed on the paper sheet P (printing unit).

When color calibration on the image forming apparatus 100 is performed, ink is ejected from the nozzle rows of the recording head 6 mounted on the carriage 5 onto the paper sheet P on the platen 16 so that a color calibration test pattern where a large number of patches 200 are arrayed is printed. Colorimetry is then implemented on each patch 200 contained in the color calibration test pattern. Each patch 200 contained in the color calibration test pattern is an image obtained by the image forming apparatus 100 by actually printing a reference color pattern using ink, and each patch 200 reflects characteristics unique to the image forming apparatus 100. For this reason, using the colorimetric values of the patches 200, a device profile describing the characteristics unique to the image forming apparatus 100 can be generated or corrected. By performing color calibration between the standard color space and the machine-dependent color on the basis of the device profile, the image forming apparatus 100 can output an image with high reproducibility.

The image forming apparatus 100 according to the embodiment includes a colorimetric camera (imaging device) 20 for performing colorimetry on each patch 200 contained in the color calibration test pattern printed on the paper sheet P. As shown in FIG. 2, the colorimetric camera 20 is supported by the carriage 5 on which the recording head 6 is mounted. The paper sheet P is conveyed and the carriage 5 is moved to move the paper sheet P on which the color calibration pattern is printed and, at the position where the colorimetric camera 20 is opposed to each patch 200, the colorimetric camera 20 captures an image. On the basis of the RGB values of the patches 200 resulting from the imaging, colorimetric values of the patches 200 are calculated. For the embodiment, an example will be described where color calibration on the image forming apparatus 100 is performed using the colorimetric values of the patches 200 calculated from the RGB values of the patches 200 resulting from the imaging. Alternatively, color calibration on the image forming apparatus 100 can be performed using the RGB values of the patches 200 resulting from the imaging. In this case, the color calibration adjusts the volume of ink (recording agent) to be ejected onto the paper sheet P (for electrography, the ink is toner to be transferred onto a paper sheet).

The image forming apparatus 100 has a function of, using the colorimetric camera 20, detecting positions relating to printing. For example, using the colorimetric camera 20, the image forming apparatus 100 according to the embodiment detects image misalignment and detects the end of the paper sheet P. To detect image misalignment, a misalignment detection test pattern is printed on the paper sheet P. While relatively moving the colorimetric camera 20 above the paper sheet P, on which the misalignment detection test pattern is printed, by conveying the paper sheet P and moving the carriage 5, the pattern is read (imaged) and image misalignment (misalignment of a landed position of an ink droplet) is detected from, for example, a difference in the gap between patterns.

To detect the end of the paper sheet P in the sub-scanning direction, the colorimetric camera 20 is fixed at a given position and the paper sheet P is conveyed in the sub-scanning direction. By reading the position of the end of the conveyed paper sheet P in the sub-scanning direction with the colorimetric camera 20, the end of the paper sheet P in the sub-scanning direction is detected.

To detect the end in the main-scanning direction, the carriage 5 is moved in the main-scanning direction while conveying of the paper sheet P is being stopped. By reading the position of the end of the paper sheet P in the main-scanning direction using the colorimetric camera 20 that moves along with the carriage 5, the end of the paper sheet P in the main-scanning direction is detected. The end of the paper sheet P in the main-scanning direction is normally detected along with the operation for printing an image by ejecting ink from the recording head 6 onto the paper sheet P.

Specific Example of Colorimetric Camera

Figure 4A:
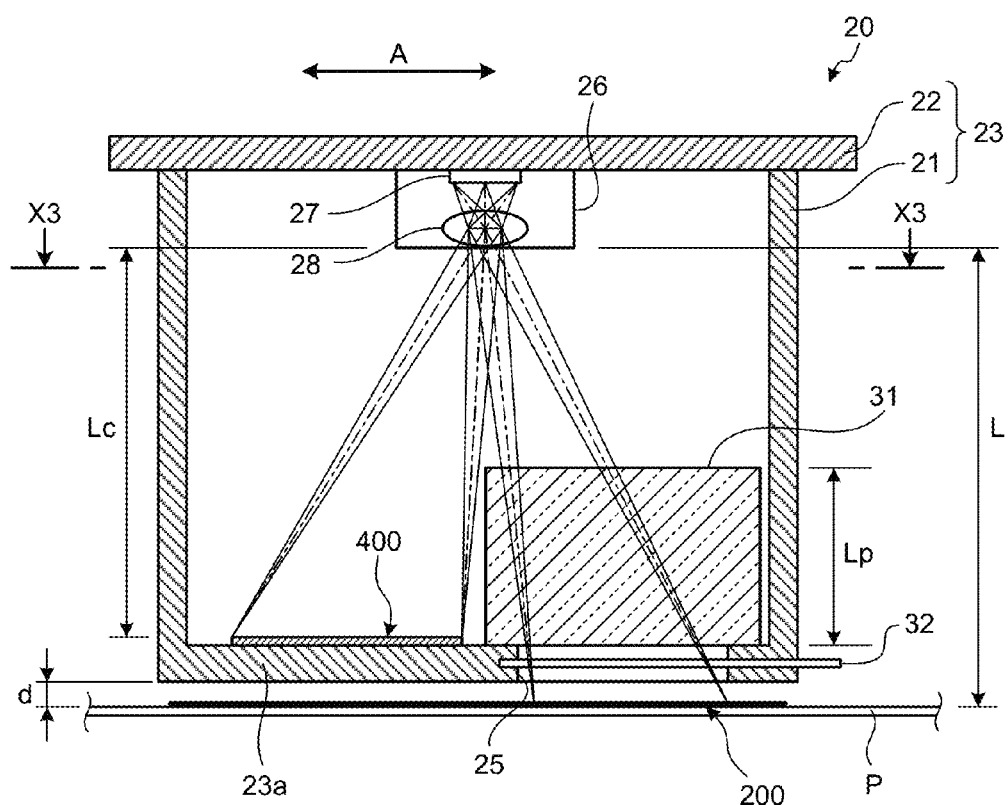
FIG. 4A is a longitudinal cross-sectional view of a colorimetric camera (a cross-sectional view taken along the X1-X1 line shown in FIG. 4C)
Figure 4B:
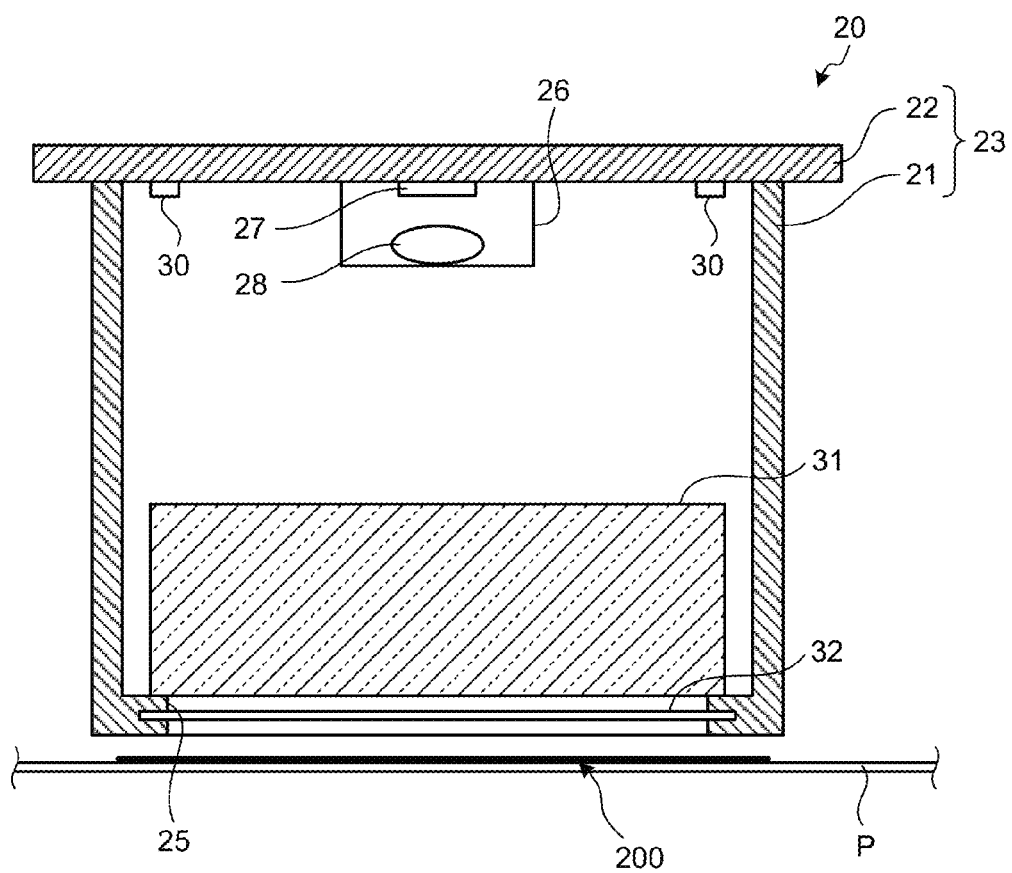
FIG. 4B is a longitudinal sectional view of the colorimetric camera (a cross-sectional view taken along the X2-X2 line shown in FIG. 4C)
Figure 4C:
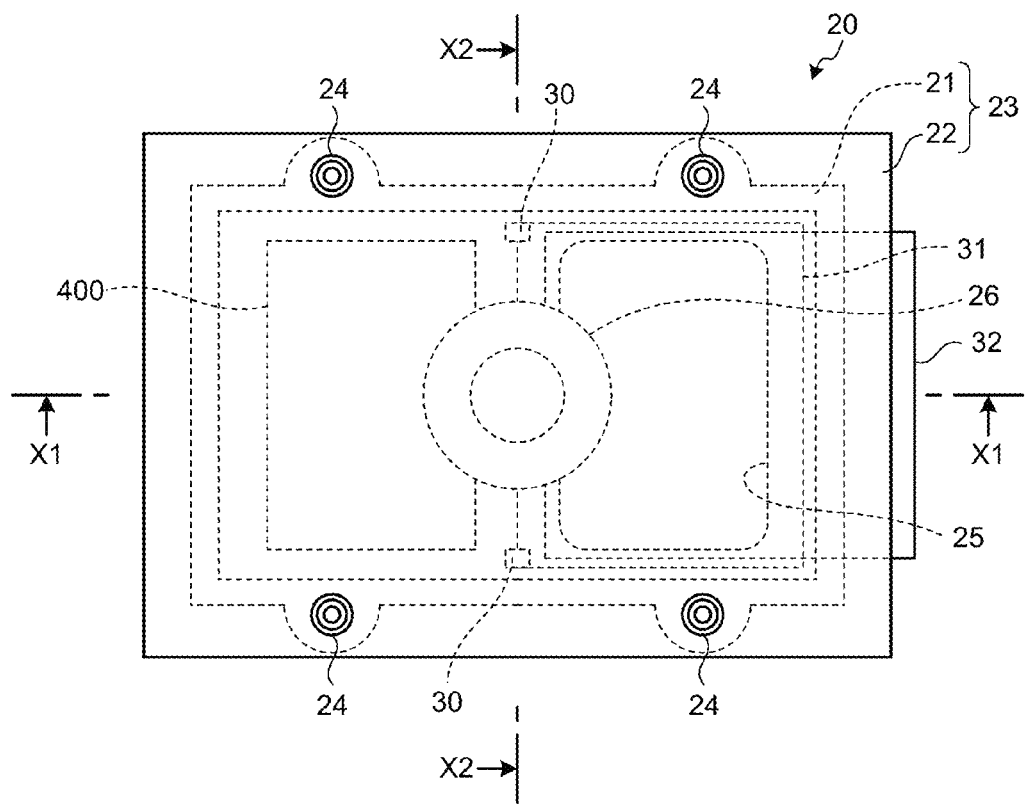
FIG. 4C is a transparent top view of the colorimetric camera.
Figure 4D:
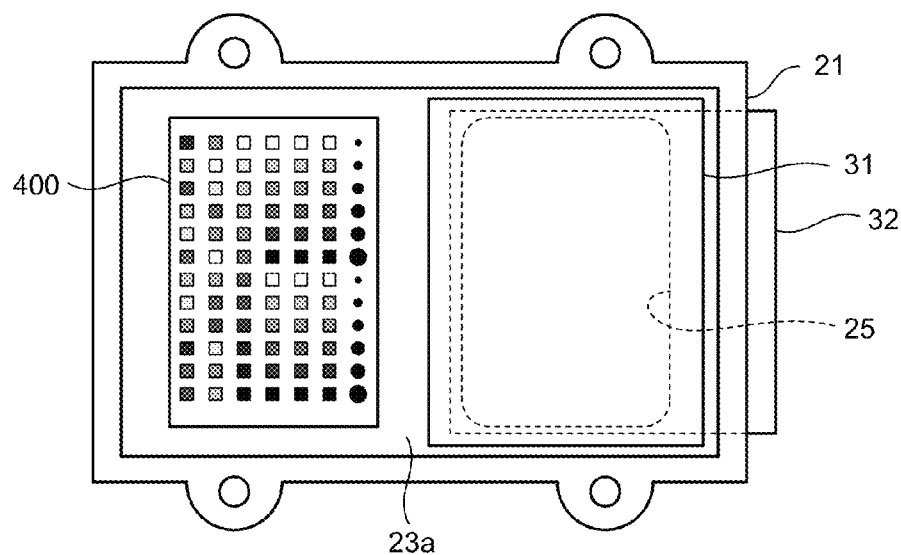
FIG. 4D is a plane view of the bottom surface of a housing viewed from the X3 direction indicated in FIG. 4A.

With reference to FIGS. 4A to 4D, a specific example of the colorimetric camera 20 will be described in detail here. FIGS. 4A to 4D show an exemplary mechanical configuration of the colorimetric camera 20. FIG. 4A is a longitudinal sectional view of the colorimetric camera 20 (a cross-sectional view taken along the X1-X1 line shown in FIG. 4C), FIG. 4B is a longitudinal sectional view of the colorimetric camera 20 (a cross-sectional view taken along the X2-X2 line shown in FIG. 4C), FIG. 4C is a transparent top view of the colorimetric camera 20; and FIG. 4D is a plane view of the bottom surface of the housing viewed from the X3 direction indicated in FIG. 4A.

The colorimetric camera 20 includes a housing 23 configured by combining a frame 21 and a substrate 22. The frame 21 is formed to be a cylinder with a bottom and one open end serving as the top surface of the housing 23. The substrate 22 is integrated with the frame 21 by being fastened to the frame 21 with fastening members 24 to close the open end of the frame 21 to form the top surface of the housing 23.

The housing 23 is fixed to the carriage 5 such that a bottom surface 23a of the housing 23 is opposed to the paper sheet P on the platen 16 with a given gap d in between. An opening 25 that allows imaging, from the inside of the housing 23, the patches 200 contained in the color calibration test pattern printed on the paper sheet P is provided to the bottom surface 23a of the housing 23 opposed to the paper sheet P.

A sensor unit 26 that images an image is provided in the housing 23. The sensor unit 26 includes a two-dimensional image sensor 27 including multiple light receiving units capable of individually reading the output values corresponding to the volume of received light and an imaging forming lens 28 that forms, on the sensor surface of the two-dimensional image sensor 27, an optical image of an imaging target area of the sensor unit 26. For the two-dimensional image sensor 27, for example, a CMOS area image sensor is used. The two-dimensional image sensor 27 is mounted, for example, on the inner surface of the substrate 22 (parts mounting surface) such that the sensor surface faces the bottom surface 23a of the housing 23. The imaging forming lens 28 is fixed as being positioned with respect to the two-dimensional image sensor 27 such that a positional relationship determined according to the optical characteristics of the imaging forming lens 28 can be maintained.

A reference chart 400 is arranged on the inner surface of the bottom surface 23a of the housing 23 opposed to the sensor unit 26 of the bottom surface 23a such that the reference chart 400 is adjacent to the opening 25 provided to the bottom surface 23a. The reference chart 400 is imaged together with the patches 200 by the sensor unit 26 when colorimetry is performed on the patches 200 contained in the test pattern. The reference chart 400 is disposed on the bottom surface 23a of the housing 23 such that the reference chart 400 is contained in the imaging target area of the sensor unit 26 when the patches 200 outside the housing 23 on which colorimetry is to be performed are imaged. The reference chart 400 will be described in detail below.

Illumination light sources 30 that illuminate the imaging target area of the sensor unit 26 is provided inside the housing 23. For the illumination light sources 30, for example, LEDs (light emitting diode) are used. In the embodiment, two LEDs are used as the illumination light sources 30. The two LEDs used as the illumination light sources 30 are mounted on the inner surface of the substrate 22 together with the two-dimensional image sensor 27 of the sensor unit 26. It suffices if the illumination light sources 30 are disposed in positions where the illumination light sources 30 can illuminate the imaging target area of the sensor unit 26 uniformly, and illumination light sources 30 are not necessarily mounted directly on the substrate 22. In the embodiment, LEDs are used as the illumination light sources 30. However, the type of light source is not limited to LED. For example, organic EL may be used for the illumination light sources 30. If organic EL is used for the illumination light sources 30, illumination light having a spectral distribution close to that of sunlight can be obtained and accordingly improvement in the colorimetric accuracy can be expected.

In the embodiment, as shown in FIG. 4C, the two LEDs used as the illumination light sources 30 are disposed such that the projection positions above the bottom surface 23a of the housing 23 at the time when the two LEDs are viewed vertically with respect to the bottom surface 23a from the substrate 22 are within the area between the opening 25 and the reference chart 400 and are at the positions symmetrical with each other about the sensor unit 26. In other words, the opening 25 and the reference chart 400 are disposed at positions such that the line connecting the two LEDs used as the illumination light sources 30 passes through the center of the imaging forming lens 28 of the sensor unit 26 and such that line symmetry about the line connecting the two LEDs is formed. By disposing the two LEDs used as the illumination light sources 30 in this manner, the patches 200 outside the housing 23 on which colorimetry is to be performed and the reference chart 400 inside the housing 23 can be illuminated under approximately the same condition.

In order to illuminate the patches 200 outside the housing 23 under the same conditions as those for the reference chart 400 disposed in the housing 23, it is necessary to illuminate the patches 200 with only the illumination light from the illumination light sources 30. In order not to apply eternal light to the patches 200, it is effective to reduce the space d between the bottom surface 23a of the housing 23 and the paper sheet P to block external light toward the patches 200 with the housing 23. However, if the space d between the bottom surface 23a of the housing 23 and the paper sheet P is too small, there is a risk that the paper P makes contact with the bottom surface 23a of the housing 23 and accordingly the image cannot be imaged properly. Thus, it is preferable that, for the space d between the bottom surface 23a of the housing 23 and the paper sheet P, a small value be set within a range where the paper sheet P does not make contact with the bottom surface 23a of the housing 23. For example, if approximately 1 to 2 mm is set for the space d between the bottom surface 23a of the housing 23 and the paper sheet P, the paper sheet P does not make contact with the bottom surface 23a of the housing 23 and external light can be effectively prevented from being applied to the patches 200 formed on the paper sheet P.

An optical path length changing member 31 is disposed in the housing 23 such that the opening 25 is closed at the inside of the housing 23. The optical path length changing member 31 is an optical element having a refractive index n (n is an arbitrary number) and a permeability sufficient to the light of the illumination light sources 30 (illumination light). The optical path length changing member 31 is disposed on the optical path between the patches 200 outside the housing 23 and the sensor unit 26 and has a function of moving the imaging surface of an optical image of the patches 200 close to the imaging surface of an optical image of the reference chart 400. In other words, in the colorimetric camera 20 of the embodiment, by disposing the optical path length changing member 31 between the patches 200 and the sensor unit 26, both the imaging surface of the optical image of the patches 200 outside the housing 23 and the imaging surface of the reference chart 400 in the housing 23 are aligned to the sensor surface of the two-dimensional image sensor 27 of the sensor unit 26.

Once light passes through the optical path length changing member 31, the optical path length extends according to the refractive index n of the optical path length changing member 31 and an image is seen as if it is floating. An amount C of floating of the image can be calculated according to the following equation:

$$C = Lp(1 - 1/n)$$

where Lp is the length of the optical path length changing member 31 in the optical axis direction.

A distance L between the principal point of the imaging forming lens 28 and the front focal point plane (imaging plane) of an optical image transmitted through the optical path length changing member 31 can be calculated according to the following equation:

$$L = Lc + Lp(1 - 1/n)$$

where Lc is the distance between the principal point of the imaging forming lens 28 of the sensor unit 26 and the reference chart 400.

Here, if the refractive index n of the optical path length changing member 31 is 1.5, $L = Lc + Lp(1/3)$ is satisfied and the optical path length of the optical image transmitted through the optical path length changing member 31 can be extended by approximately a third of the length Lp of the optical path length changing member 31 in the optical axis direction. In this case, for example, if Lp=9 [mm] is satisfied, L=Lc+3 [mm] is satisfied. Accordingly, if imaging is performed in a state where the difference between the distance from the sensor unit 26 to the reference chart 400 and the distance from the sensor unit 26 to the patches 200 is 3 mm, a back focal point plane (imaging plane) of the optical image of the reference chart 400 and the back focal point plane (imaging plane) of the optical image of the patches 200 can be aligned to the sensor surface of the two-dimensional image sensor 27 of the sensor unit 26.

The image forming apparatus 100 of the embodiment is configured to, as described above, eject ink onto the paper sheet P on the platen 16 from the nozzle rows of the recording head 6 mounted on the carriage 5 to print an image on the paper sheet P. For this reason, when ink is ejected from the nozzle rows of the recording head 6, misty fine ink particles (hereinafter, such fine ink particles are referred to as "mist") occurs. There is a risk that, once the mist occurring upon printing enters the housing 23 via the opening 25 from the onside of the housing 23 of the colorimetric camera 20 that is fixed to the carriage 5 and provided, the mist entering the housing 23 is attached to the sensor unit 26, the illumination light sources 30, the optical path length changing member 31, etc. so that correct RGB values cannot be obtained when performing colorimetry on the patches 200. Thus, in the colorimetric camera 20 of the embodiment, by disposing a mist prevention glass 32 at the opening 25 provided to the bottom surface 23*a* of the housing 23, the mist occurring upon printing is prevented from entering the housing 23.

The mist prevention glass 32 is a transparent optical element that has a refractive index sufficient to the light (illumination light) of the illumination light sources 30 and that is formed to be a platy shape in a size that can cover whole the opening 25. The mist prevention glass 32 is mounted on a slit that is formed along the bottom surface 23*a* of the housing 23 so as to close whole the opening 25 provided to the bottom surface 23*a* of the housing 23. The slit on which the mist prevention glass 32 is mounted is open at a side surface of the housing 23. The mist prevention glass 32 can be inserted from the side surface of the housing 23 and mounted on the slit. The mist prevention glass 32 can be also detached from the side surface of the housing 23 and can be replaced as appropriate.

Specific Example of Reference Chart

Figure 5:
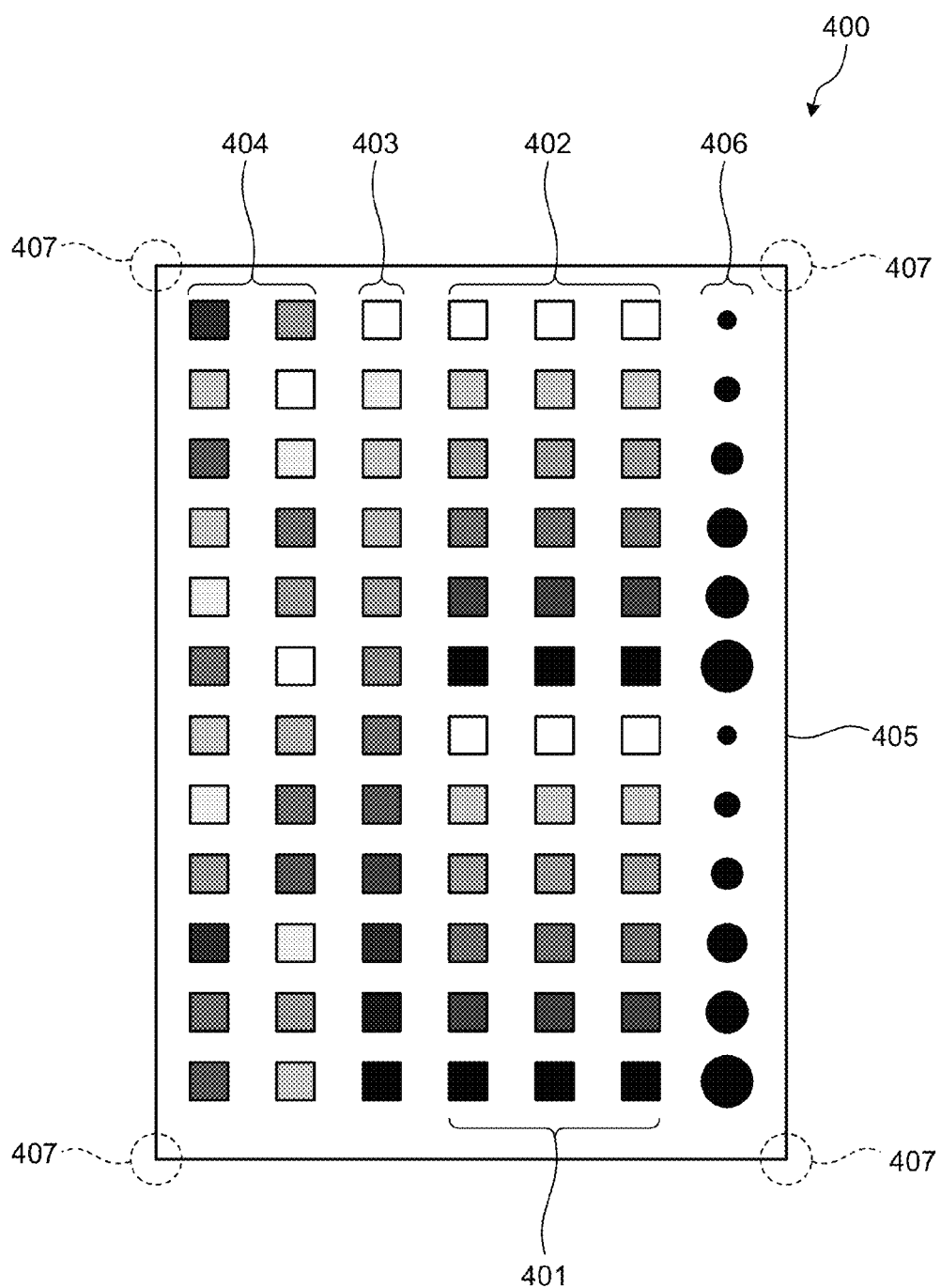
FIG. 5 is a diagram illustrating a specific example of a reference chart.

The reference chart 400 that is disposed in the housing 23 of the colorimetric camera 20 will be described in detail below with reference to FIG. 5. FIG. 5 depicts a specific example of the reference chart 400.

The reference chart 400 shown in FIG. 5 includes multiple reference patch lines 401 to 404 in which colorimetric reference patches are arrayed, a dot diameter measurement pattern line 406, a distance measurement line 405, and chart position specifying markers 407.

The reference patch lines 401 to 404 include reference patch lines 401 in which reference patches of primary YMCK colors are arrayed according to the tone, reference patch lines 402 in which reference patches of secondary RGB colors arrayed according to the tone, a reference patch line 403 (a colorless tone pattern) in which gray-scale reference patches are arrayed according to the tone, and reference patch lines 404 in which reference patches of tertiary colors are arrayed. The dot diameter measurement pattern line 406 is a pattern line for measuring geometric shapes in which circular patterns in different sizes are arrayed according to the size. The dot diameter measurement pattern line 406 can be used to measure the diameters of dots of the image printed on a paper sheet P.

The distance measurement line 405 is formed as a rectangular frame surrounding the multiple reference patch lines 401 to 404 and the dot diameter measurement pattern line 406. The chart position specifying markers 407 are provided at the positions of four corners on the distance measurement line 405 and function as markers for specifying the position of each reference patch. By specifying the distance measurement line 405 and the chart position specifying markers 407 at the four corners from the image of the reference chart 400 that is captured by the sensor unit 26, the position of the reference chart 400 and the positions of each reference patch and the pattern can be specified.

Each of the reference patches constituting the colorimetric reference patch lines 401 to 404 are used as references of tones that reflect the imaging conditions of the colorimetric camera 20. The configuration of the colorimetric reference patch lines 401 to 404 that are disposed in the reference chart 400 is not limited to the example shown in FIG. 5 and arbitrary reference patch lines may be used. For example, reference patches with which a color range can be specified as wide as possible may be used. Furthermore, the primary YMCK reference patch line 401 and the gray-scale reference patch line 403 may be configured of patches of colorimetric values of ink used in the image forming apparatus 100. The reference patch lines 402 of the secondary RGB colors may be configured of patches of colorimetric values that can color with the ink used in the image forming apparatus 100. Alternatively, a reference color chart in which colorimetric values of, for example, Japan Color may be used.

In the embodiment, the reference chart 400 including the reference patch lines 401 to 404 having a normal patch (color chart) shape is used. However, the reference chart 400 does not necessarily include the reference patch lines 401 to 404 described above. It suffices if the reference chart 400 is configured such that multiple colors that can be used for colorimetry are arrayed such that each position can be specified.

Because the reference chart 400 is disposed next to the opening 25 on the bottom surface 23*a* of the housing 23 of the colorimetric camera 20, the sensor unit 26 can simultaneously image the reference chart 400 and the patches 200 on which colorimetry is to be performed. The simultaneous imaging means that image data of one frame containing the patches 200 on which colorimetry is to be performed and the reference chart 400 is captured. In other words, even if there is a time difference in data acquisition per pixel, by acquiring image data containing the patches 200 and the reference chart 400 in one frame, the patches 200 and the reference chart 400 can be imaged simultaneously.

The above-described mechanical configuration of the colorimetric camera 20 is an example only, and the configuration of the colorimetric camera 20 is not limited to this. It suffices if the colorimetric camera 20 of the embodiment is at least configured to image a subject using the two-dimensional image sensor 27. Various modifications or changes can be made to the above-described configuration.

Schematic Configuration of Control Mechanism of Image Forming Apparatus

Figure 6:
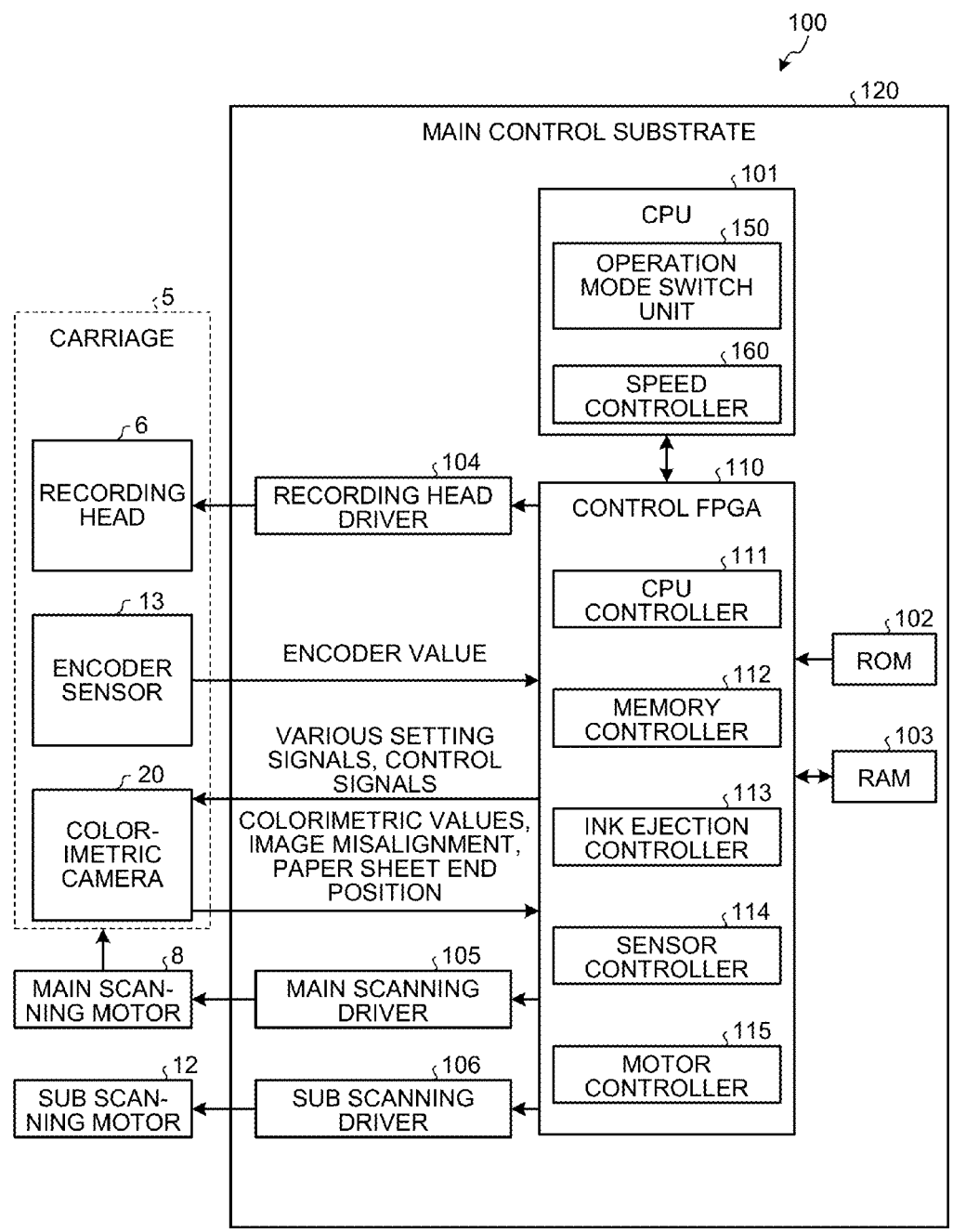
FIG. 6 is a control block diagram of the image forming apparatus.

With reference to FIG. 6, a schematic configuration of a control mechanism of the image forming apparatus 100 of the embodiment will be described here. FIG. 6 is a control block diagram of the image forming apparatus 100.

As shown in FIG. 6, the image forming apparatus 100 of the embodiment includes a CPU 101, a ROM 102, a RAM 103, a recording head driver 104, a main scanning driver 105, a sub scanning driver 106, a control FPGA (Field-Programmable Gate Array) 110, the recording head 6, the colorimetric camera 20, the encoder sensor 13, the main scanning motor 8, and a sub scanning motor 12. The CPU 101, the ROM 102, the RAM 103, the recording head driver 104, the main scanning driver 105, the sub scanning driver 106, and the control FPGA 110 are mounted on a main control substrate 120. The recording head 6, the encoder sensor 13, and the colorimetric camera 20 are mounted on the carriage 5 as described above.

The CPU 101 controls the whole image forming apparatus 100. For example, the CPU 101 uses the RAM 103 as a working area, executes various control programs stored in the ROM 102, and outputs control instructions for controlling each operation of the image forming apparatus 100. Particularly, in the image forming apparatus 100 according to the embodiment, the CPU 101 executes a given program to implement the function of an operation mode switch unit 150 and the function of a speed controller 160.

The operation mode switch unit 150 switches the operation mode of the two-dimensional image sensor 27 according to the purpose of using the colorimetric camera 20. In the embodiment, for the operation mode of the two-dimensional image sensor 27, there are two pre-defined modes: a whole reading mode (first operation mode) for performing colorimetry on the patches 200 using the colorimetric camera 20 and a partial reading mode (second operation mode) in which the colorimetric camera 20 is used for a purpose other than colorimetry on the patches 200, e.g., detection of positions relating to the above-described printing (detection of image misalignment or detection of the end of the paper sheet P). The operation mode switch unit 150 generates a control signal that specifies the operation mode according to the purpose of using the colorimetric camera 20 (i.e., the purpose of using the output values of the two-dimensional image sensor 27) and, by transmitting the control signal to the colorimetric camera 20, switches the operation mode of the two-dimensional image sensor 27.

The whole reading mode is an operation mode in which output values are read from all the light receiving units of the two-dimensional image sensor 27. The partial reading mode is an operation mode in which output values are read from a part of the light receiving units of the two-dimensional image sensor 27. In the colorimetric camera 20, on the basis of the control signal that specifies the operation mode, a setting is made for an area of the light receiving units of the two-dimensional image sensor 27 from which output values are read (hereinafter, the area is referred to as the "imaging area"). When the partial reading mode is specified as the operation mode of the two-dimensional image sensor 27, because the imaging area is narrower than that in the case where the whole imaging mode is specified, the time required to read all output values from the respective light receiving units in the imaging area (hereinafter, the "reading time") is shorter than that in the whole reading mode.

The speed controller 160 controls the relative moving speed between the colorimetric camera 20 and the subject (in the embodiment, the paper sheet P) to be imaged by the colorimetric camera 20 according to the size of the imaging area of the two-dimensional image sensor 27 that is set according to the control signal from the operation mode switch unit 150. In other words, the speed controller 160 controls the speed at which the carriage 5 moves in the main-scanning direction and the speed at which the paper sheet P is conveyed in the sub-scanning direction.

The recording head driver 104, the main scanning driver 105, and the sub scanning driver 106 are drivers for driving the recording head 6, the main scanning motor 8, and the sub scanning motor 12, respectively.

The control FPGA 110 controls each operation of the image forming apparatus 100 in cooperation with the CPU 101. The control FPGA 110 includes, for example, a CPU controller 111, a memory controller 112, an ink ejection controller 113, a sensor controller 114, and a motor controller 115 as functional components.

The CPU controller 111 communicates with the CPU 101 to transmit various types of information acquired by the control FPGA 110 to the CPU 101 and receives control instructions that are output from the CPU 101.

The memory controller 112 performs memory control for the CPU 101 to access the ROM 102, the RAM 103, etc.

The ink ejection controller 113 controls the operations of the recording head driver 104 according to the control instructions from the CPU 101 to control the timing at which ink is ejected from the recording head 6 that is driven by the recording head driver 104.

The sensor controller 114 performs processing on sensor signals, such as an encoder value that is output from the encoder sensor 13.

The motor controller 115 controls operations of the main scanning driver 105 according to control instructions from the CPU 101 to control the main scanning motor 8 that is driven by the main scanning driver 105, thereby controlling moving of the carriage 5 in the main-scanning direction. The motor controller 115 controls the operations of the sub scanning driver 106 according to control instructions from the CPU 101 to control the sub scanning motor 12 that is driven by the sub scanning driver 106, thereby controlling moving of the paper sheet P on the platen 16 in the sub-scanning direction.

The above-described units are an example of the control functions implemented by the control FPGA 110, and the control FPGA 110 may be configured to implement various control functions in addition to the above-described control functions. For example, the above-described functions of the operation mode switch unit 150 and the speed controller 160 that are implemented with the program executed by the CPU 101 may be implemented by the control FPGA 110. Alternatively, all or a part of the above-described control functions may be implemented with a program that is executed by the CPU 101 or another general-purpose CPU. Alternatively, a part of the above-described control functions may be implemented with dedicated hardware, such as another FPGA or ASIC (Application Specific Integrated Circuit) different from the control FPGA 110.

The recording head 6 is driven by the recording head driver 104, whose operations are controlled by the CPU 101 and the control FPGA 110, and ejects ink onto the paper sheet P on the platen 16 to print an image. When color calibration is performed on the image forming apparatus 100, the recording head 6 ejects ink onto the paper sheet P according to the control by the CPU 101 and the control FPGA 110 so that the color calibration test pattern where a large number of patches 200 on which colorimetry is to be performed are arrayed. Furthermore, when image misalignment is adjusted, the recording head 6 ejects ink onto the paper sheet P according to the control by the CPU 101 and the control FPGA 110 so that, for example, a misalignment detection test pattern in which line patterns are arrayed is printed.

As described above, when color calibration on the image forming apparatus 100 is performed, the colorimetric camera 20 images each patch 200 contained in the color calibration test pattern together with the reference chart 400 using the two-dimensional image sensor 27 and, on the basis of the RGB values of the patches 200 and the RGB values of each reference patch of the reference chart 400, the colorimetric values of the patches 200 (color values in a standard color space, such as the L*a*b* values in a L*a*b* color space (hereinafter, L*a*b* is referred to as "Lab")) are calculated. The colorimetric values of the patches 200 calculated by the colorimetric camera 20 are transmitted to the CPU 101 via the control FPGA 110. A specific example of the method of performing colorimetry on the patches 200 according to the embodiment will be described in detail below.

The color calibration on the image forming apparatus 100 can be performed using the RGB values of the patches 200 as described above. In this case, the colorimetric camera 20 images each patch 200 contained in the color calibration test pattern together with the reference chart 400 using the two-dimensional image sensor 27 and, using the RGB values of each reference patch of the reference chart 400, performs processing for correcting errors resulting from fluctuations of the illumination light sources 30 on the RGB values of the patches 200 obtained from the captured image. The corrected RGB values of the patches 200 are transmitted from the colorimetric camera 20 to the CPU 101 via the control FPGA 110. By adjusting the parameters for controlling the volume of ink to be ejected using the RGB values, the CPU 101 adjusts the volume of ink to be ejected onto the paper sheet P from the recording head 6.

The colorimetric camera 20 is also used for not only performing colorimetry on (imaging) the patches 200 but also detecting image misalignment and detecting the end of the paper sheet P. Information on the image misalignment detected by the colorimetric camera 20 and information on the position of the end of the paper sheet P is transmitted to the CPU 101 via the control FPGA 110.

The encoder sensor 13 outputs the encoder value obtained by detecting the mark of the encoder sheet 14 to the control FPGA 110. The encoder value is transmitted from the control FPGA 110 to the CPU 101 and, for example, is used to calculate the position and speed of the carriage 5. The CPU 101 generates a control instruction for controlling the main scanning motor 8 on the basis of the position and speed of the carriage 5, which are calculated from the encoder value, and outputs the control instruction.

Configuration of Control Mechanism of Colorimetric Camera

Figure 7:
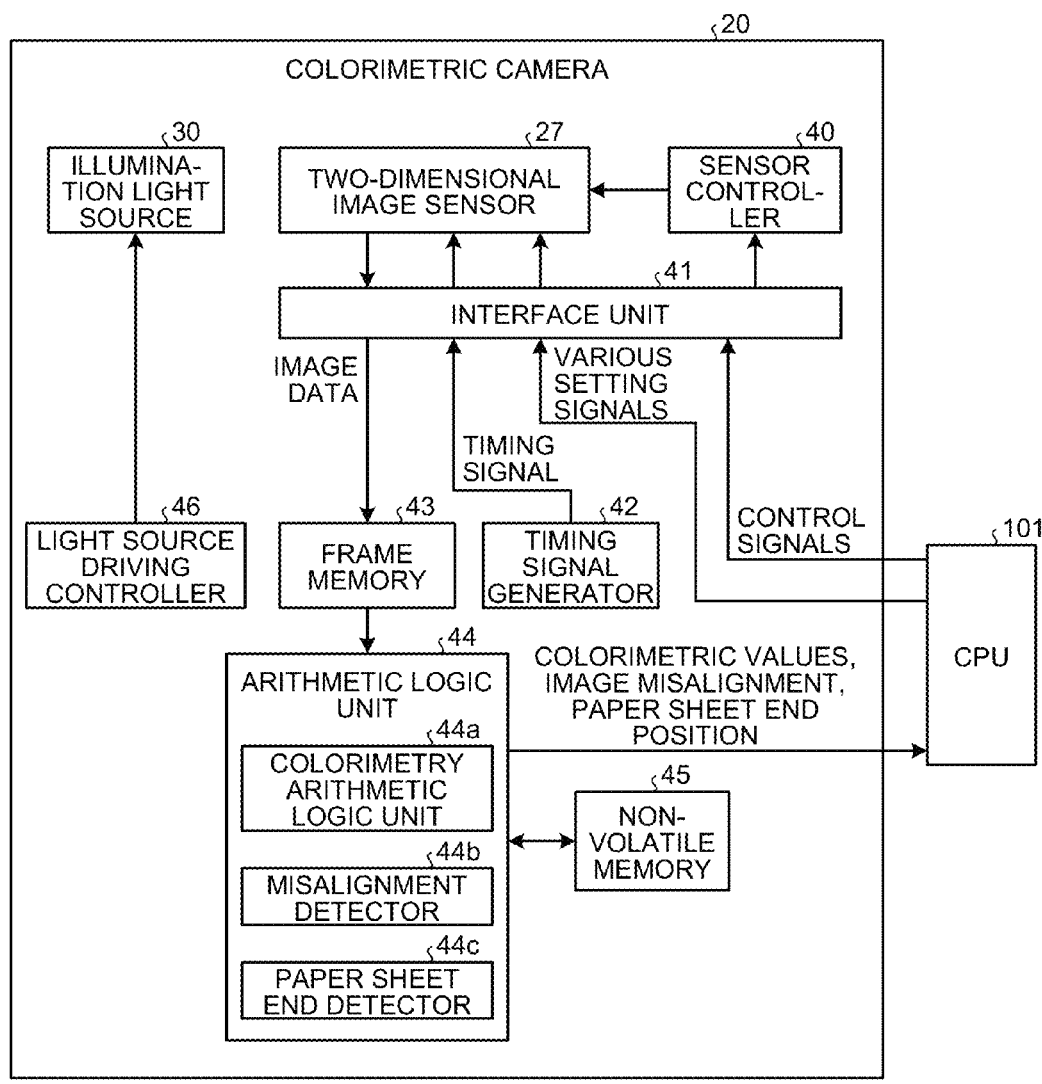
FIG. 7 is a control block diagram of the colorimetric camera.

With reference to FIG. 7, an exemplary configuration of a control mechanism of the colorimetric camera 20 will be described in detail here. FIG. 7 is a control block diagram of the colorimetric camera 20.

As shown in FIG. 7, the colorimetric camera 20 includes, in addition to the two-dimensional image sensor 27 and the illumination light sources 30, a sensor controller 40, an interface unit 41, a timing signal generator 42, a frame memory 43, an arithmetic logic unit 44, a non-volatile memory 45, and a light source driving controller 46. Each of these units is mounted on, for example, the substrate 22 configuring the top surface of the housing 23 of the colorimetric camera 20.

The two-dimensional image sensor 27 receives light that is incident on the light receiving units via the above-described imaging forming lens 28, reads the output value corresponding to the volume of light received by each light receiving unit, and outputs the output value as image data. The two-dimensional image sensor 27 has a function of converting the output value of each light receiving unit to image data by performing AD conversion and performing various types of image processing, such as shading correction or white balance correction, γ correction, and format conversion, on the image data and outputs the image data that has undergone the image processing. All or a part of the various types of image processing on the image data may be performed outside the two-dimensional image sensor 27.

The sensor controller 40 sets an imaging area of the two-dimensional image sensor 27 on the basis of the control signal specifying the operation mode of the two-dimensional image sensor 27 from the CPU 101 and controls reading of the output values according to the operation mode of the two-dimensional image sensor 27.

Figure 8:
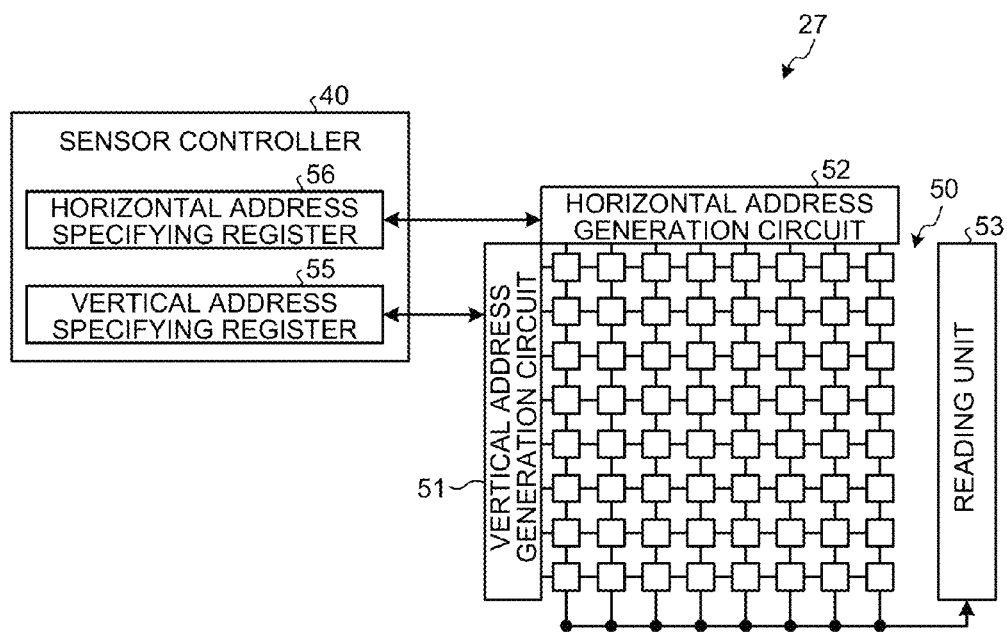
FIG. 8 is a schematic diagram illustrating a two-dimensional image sensor and a sensor controller in detail.
Figure 9:
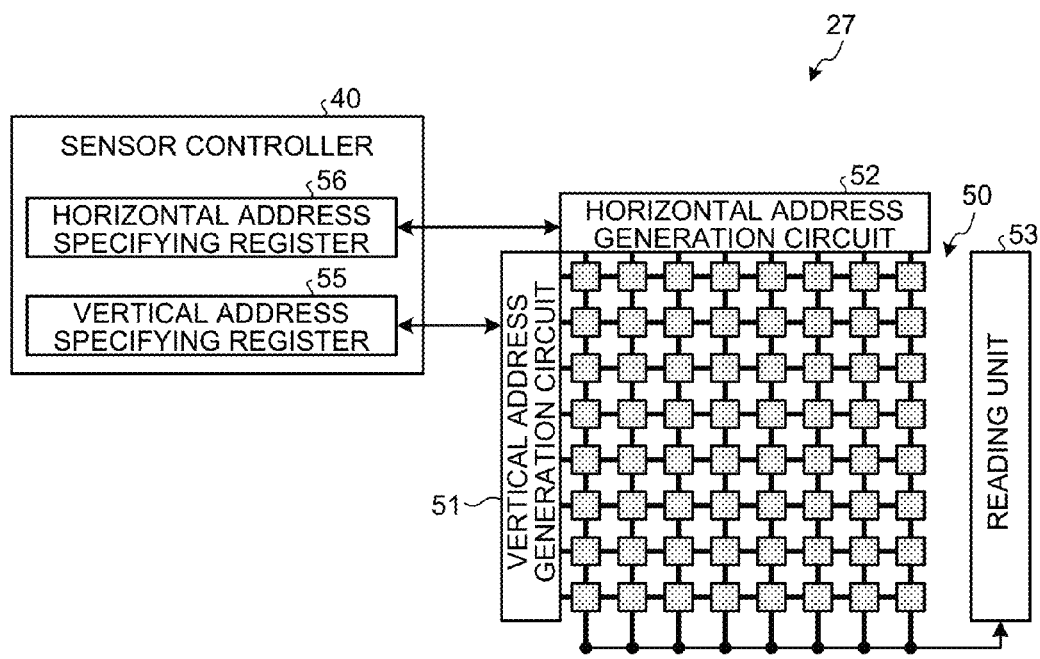
FIG. 9 is a schematic diagram illustrating reading of output values in a case where an imaging area according to a whole reading mode is set.
Figure 10:
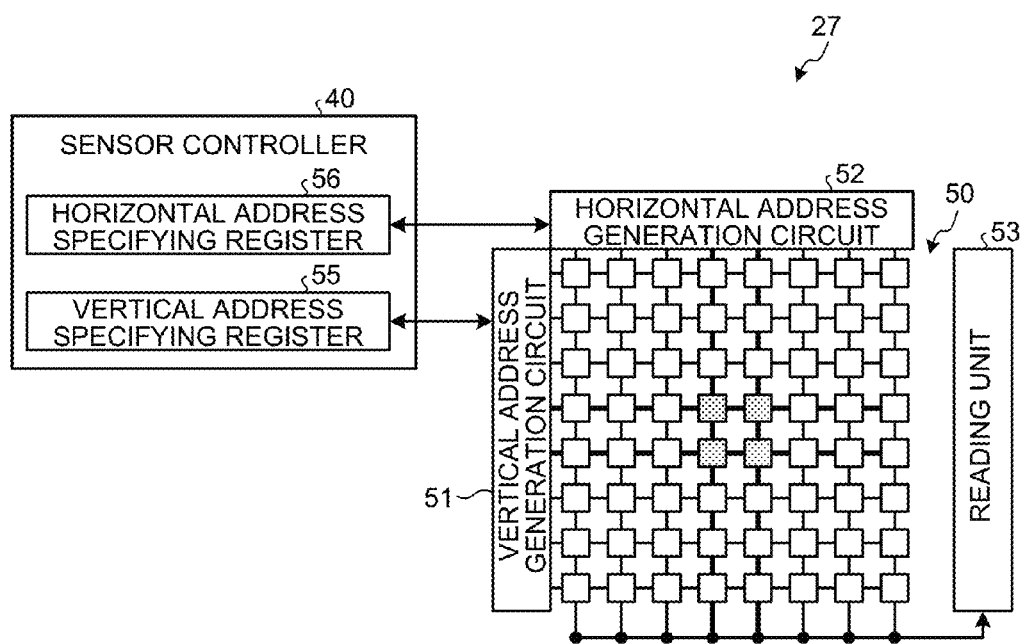
FIG. 10 is a schematic diagram illustrating reading of output values in a case where an imaging area according to a partial reading mode is set.

FIG. 8 is a schematic diagram illustrating the two-dimensional image sensor 27 and the sensor controller 40 in detail. As shown in FIG. 8, the two-dimensional image sensor 27 includes multiple light receiving units 50 that are arrayed vertically and horizontally, i.e., two-dimensionally, a vertical address generation circuit 51, a horizontal address generation circuit 52, and a reading unit 53. The output values of the light receiving units 50 that are specified by the vertical address generation circuit 51 and the horizontal address generation circuit 52, from among the light receiving units 50 of the two-dimensional image sensor 27, are sequentially read by the reading unit 53. FIG. 8 and FIGS. 9 and 10 to be described below represent the limited number of light receiving units 50 to simplify the drawings, but more light receiving units 50 are arrayed two-dimensionally in a practical configuration.

The sensor controller 40 includes a vertical address specifying register 55 to be referred to by the vertical address generation circuit 51 and a horizontal address specifying register 56 to be referred to by the horizontal address generation circuit 52. The vertical address specifying register 55 is a register that stores vertical addresses of the light receiving units 50 within the imaging area that is set according to the operation mode of the two-dimensional image sensor 27. The horizontal address specifying register 56 is a register that stores horizontal addresses of the light receiving units 50 within the imaging area that is set according to the operation mode of the two-dimensional image sensor 27. By storing, in the vertical address specifying register 55 and the horizontal address specifying register 56, the addresses of the light receiving units 50 from which output values are read on the basis of the control signal specifying the operation mode of the two-dimensional image sensor 27 from the CPU 101, the sensor controller 40 sets an imaging area of the two-dimensional image sensor 27 and controls reading of output values performed by the reading unit 53.

FIG. 9 is a schematic diagram illustrating reading of output values in a case where an imaging area according to the whole reading mode is set. The whole reading mode is, as described above, an operation mode of the two-dimensional image sensor 27 that is specified by the CPU 101 when performing colorimetry on the patches 200 using the output values of the light receiving units 50 of the two-dimensional image sensor 27, i.e., an operation mode in which all the light receiving units 50 of the two-dimensional image sensor 27 serve as the imaging area.

Once the imaging area according to the whole reading mode is set, as shown in FIG. 9, all the light receiving units 50 of the two-dimensional image sensor 27 are successively specified by the vertical address generation circuit 51 and the horizontal address generation circuit 52. The reading unit 53 then sequentially reads the output values from all the light receiving units 50 of the two-dimensional image sensor 27.

In the embodiment, the whole reading mode is specified when colorimetry on the patches 200 is performed using the two-dimensional image sensor 27. In the whole reading mode, output values are read from all the light receiving units 50 of the two-dimensional image sensor 27. However, when colorimetry on the patches 200 is performed, it is not necessarily required to read the output values from all the light receiving units 50 and it suffices if an imaging area wide enough to obtain RGB values necessary for colorimetry is set. Here, the RGB values necessary for colorimetry are, in a case where the reference chart 400 is used for colorimetry on the patches 200, RGB values of the patches 200 on which colorimetry is to be performed and RGB values of each reference patch contained in the reference chart 400. The RGB values of the patches 200 on which colorimetry is to be performed are obtained by, for example, averaging image data on an area on which colorimetry is to be performed that is set near the central part of an area where the patches 200 are imaged from among the image data that is output by the two-dimensional image sensor 27. The RGB values of each reference patch of the reference chart 400 are obtained by, for example, averaging image data on the area where each reference patch of the reference chart 400 is imaged from among the image data that is output by the two-dimensional image sensor 27. For this reason, in this case, it suffices if an imaging area in a size covering at least the reference chart 400 and the above-described area on which colorimetry is to be performed (around the center of the opening 25) is set. In other words, it suffices if, on the basis of the control signal specifying the first operation mode from the CPU 101, the sensor controller 40 sets an area covering at least the reference chart 400 and the above-described area on which colorimetry is to be performed (around the center of the opening 25) is set for the imaging area of the two-dimensional image sensor 27.

As described above, in a case where color calibration on the image forming apparatus 100 is performed using the RGB values of the patches 200, the whole reading mode is specified as the operation mode of the two-dimensional image sensor 27. Also in this case, it is not necessarily required to read output values from all the light receiving units 50 of the two-dimensional image sensor 27 and it suffices if, for example, the imaging area of the two-dimensional image sensor 27 is set such that the central part of an area where the patches 200 are imaged (near the center of the opening 25) and the area where the reference chart 400 is imaged are covered.

FIG. 10 is a schematic diagram illustrating reading of output values in a case where an imaging area according to the partial reading mode is set. As described above, the partial reading mode is an operation mode of the two-dimensional image sensor 27 specified by the CPU 101 in a case where is performed processing using the output values of the light receiving units 50 of the two-dimensional image sensor 27, such as detection of positions relating to printing (detection of image misalignment or detection of the end of the paper sheet P), other than colorimetry on the patches 200. In the partial reading mode, the imaging area of the two-dimensional image sensor 27 is limited to the area of a part of the light receiving units 50.

In the example shown in FIG. 10, the area of four light receiving units 50 positioned at the central part of the sensor surface of the two-dimensional image sensor 27 is set for the imaging area. However, the number and positions of the light receiving units 50 in the imaging area that is set according to the partial reading mode are not limited to this example. The imaging area that is set according to the partial reading mode is, at least, an area narrower than the imaging area that is set according to the whole reading mode.

Once an imaging area according to the partial imaging mode is set, as shown in FIG. 10, a part of the light receiving units 50 of the two-dimensional image sensor 27 are consecutively specified by the vertical address generation circuit 51 and the horizontal address generation circuit 52. The reading unit 53 reads output values are then sequentially read from only a part of the light receiving units 50 that are specified by the vertical address generation circuit 51 and the horizontal address generation circuit 52.

In the partial reading mode, the imaging area of the two-dimensional image sensor 27 is narrower than that in the whole reading mode. For this reason, the reading time of the two-dimensional image sensor 27 in the partial reading mode is shorter than that in the whole reading mode. In other words, if a set of the output values read from the respective light receiving units 50 in the imaging area of the two-dimensional image sensor 27 is regarded as an image of one frame and the number of frames that can be acquired per second is regarded as the reading speed (fps), the reading speed in the partial reading mode is faster than that in the whole reading mode.

Figure 11:
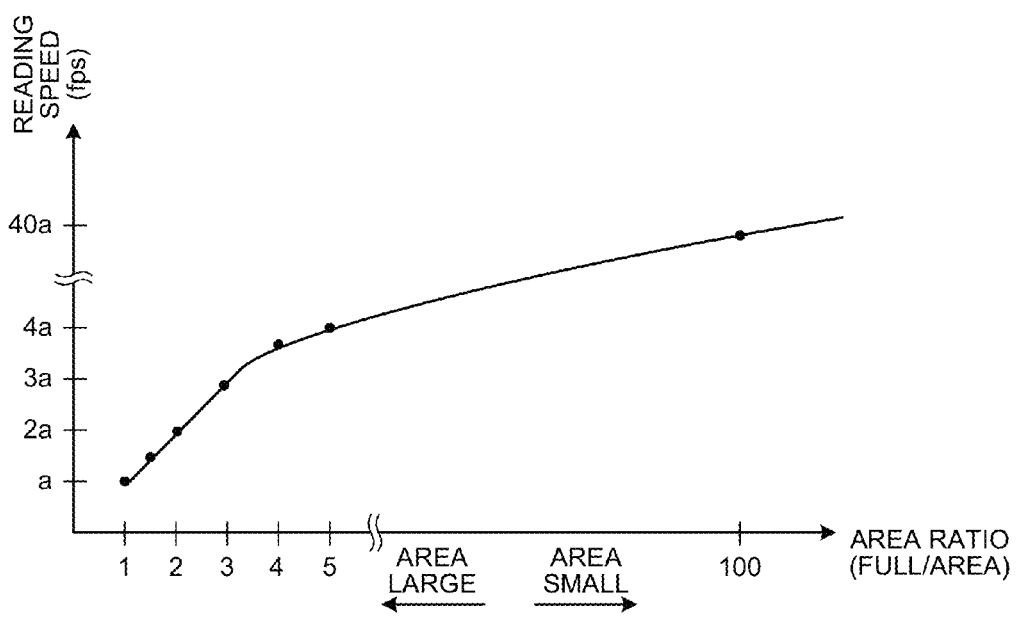
FIG. 11 is a graph illustrating the relationship between the area ratio of the imaging area of the two-dimensional image sensor and the reading speed.

FIG. 11 is a graph representing the relationship between the area ratio of the imaging area of the two-dimensional image sensor 27 and the reading speed. The horizontal axis of the graph represents the area ratio of the imaging area (the value obtained by dividing the whole sensor surface of the two-dimensional image sensor 27 by the area of the imaging area) and the vertical axis of the graph represents the relative reading speed (fps) in a case where the reading speed is a when the area ratio is 1 (i.e., in the whole reading mode). The reading speed a in a case where the area ratio is 1 depends on the performance of the two-dimensional image sensor 27. In general, the faster the reading speed a in a case where the area ratio is 1 is, the more expensive the two-dimensional image sensor is.

As shown in FIG. 11, the reading speed of the two-dimensional image sensor 27 increases as the imaging area narrows. For example, if the imaging area is a half of the whole sensor surface of the two-dimensional image sensor 27, the reading speed doubles and, if the area of the imaging area is a third of the whole sensor surface of the two-dimensional image sensor 27, the reading speed tripled. However, if the imaging area narrows to some extent, the degree of improvement in the reading speed with respect to a decrease in the area of the imaging area reduces. For example, if the area of the imaging area is a fifth of the whole sensor surface of the two-dimensional image sensor 27, the reading speed quadruples and, if the area of the imaging area is one-hundredth of the whole sensor surface of the two-dimensional image sensor 27, the reading speed increases by 37 times.

Figure 12A:
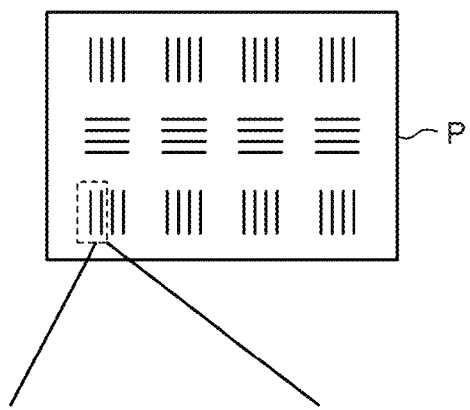
FIGS. 12(a), 12(b) and 12(c) are schematic diagrams illustrating that image misalignment is detected using the colorimetric camera.
Figure 12B:
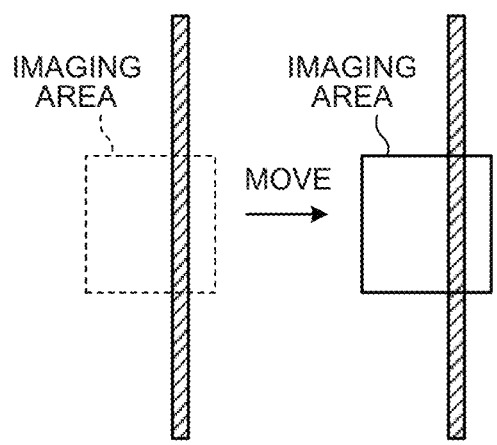
Figure 12C:
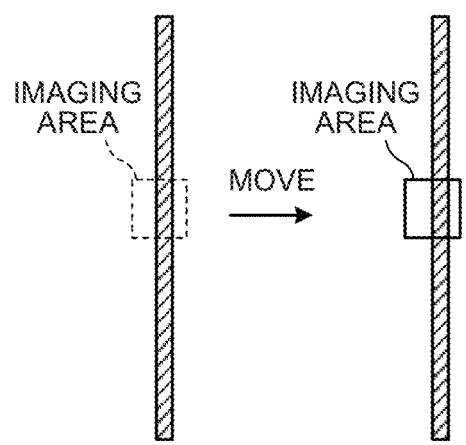

FIG. 12(a), 12(b), and 12(c) are schematic diagrams illustrating that image misalignment is detected using the colorimetric camera 20. FIG. 12(a) shows an exemplary misalignment detection test pattern printed on the paper sheet P, FIG. 12(b) shows that the pattern is read (imaged) in the whole reading mode, and FIG. 12(c) shows that the pattern is read (imaged) in the partial reading mode.

In a case where image misalignment is detected, as described above, a misalignment detection test pattern is printed on the paper sheet P and, while the colorimetric camera 20 is being moved relatively to the paper sheet P, the pattern is read (imaged) using the two-dimensional image sensor 27 of the colorimetric camera 20. The position of each pattern is calculated from the positions of the patterns and the moving speed of the colorimetric camera 20 relative to the paper sheet P and, for example, from the difference in the gap between adjacent patterns, etc., image misalignment (misalignment of a landed position of an ink droplet) is detected.

For this reason, in order to properly detect the image misalignment, it is required that reading the output value from each light receiving unit 50 in the imaging area completes while the imaging area of the two-dimensional image sensor 27 is moving across two adjacent patterns. In other words, as shown in FIGS. 12(b) and 12(c), the time required for the imaging area of the two-dimensional image sensor 27 to move from the position opposed to a pattern to a position opposed to the next pattern cannot be shorter than the reading time of the two-dimensional image sensor 27.

Because the reading speed is slow and the reading time is long in the whole reading mode where the imaging area is wide, in order to detect image misalignment by running the two-dimensional image sensor in the whole reading mode, it is necessary to lower the moving speed of the colorimetric camera 20 relative to the paper sheet P. This extends the time required for detection and accordingly the performance required for the image forming apparatus 100 is not necessarily met.

On the other hand, in the partial reading mode where the imaging area is narrow, because the reading speed in the partial reading mode is fast and accordingly the reading time is shorter than that in the whole reading mode, the moving speed of the colorimetric camera 20 relative to the paper sheet P can be increased. This shortens the time required for detection and accordingly, while the performance required for the image forming apparatus 100 is met, image misalignment detection can be performed properly. In the embodiment, when image misalignment detection is performed using the colorimetric camera 20, the two-dimensional image sensor 27 is run in the partial reading mode.

FIGS. 12(b) and 12(c) illustrate an example where image misalignment (misalignment of a landed position of an ink droplet) in the main-scanning direction is detected. In this example, the patterns arrayed in the main-scanning direction are read (imaged) while the colorimetric camera 20 is being moved relatively to the paper sheet P, on which the misalignment detection test pattern is printed, by causing the carriage 5 to move in the main-scanning direction during the time in which conveying of the paper sheet P is stopped. To detect image misalignment in the sub-scanning direction, it suffices if the patterns arrayed in the sub-scanning direction are read while the colorimetric camera 20 is being moved relatively to the paper sheet P by conveying the paper sheet P, on which the misalignment detection test pattern is printed, in the sub-scanning direction during the time in which moving of the colorimetric camera 20 is stopped.

Figure 13A:
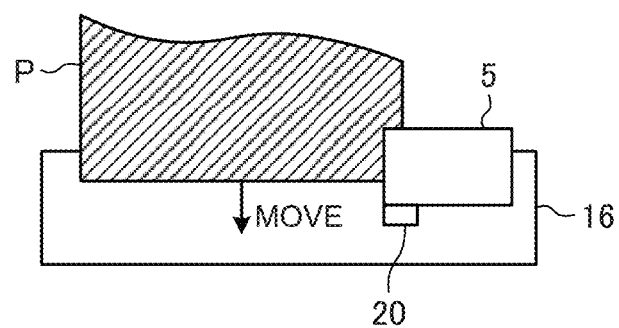
FIGS. 13(a), 13(b) and 13(c) are schematic diagrams illustrating that the end of a paper sheet in the sub-scanning direction is detected using the colorimetric camera.
Figure 13B:
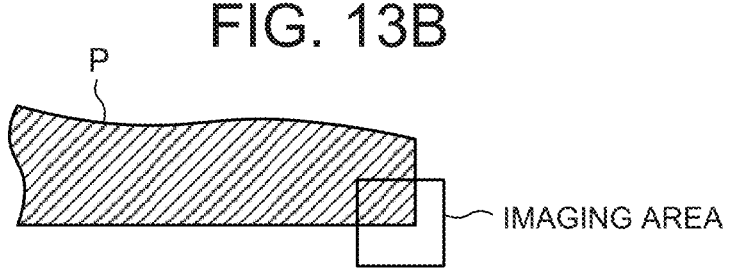
Figure 13C:
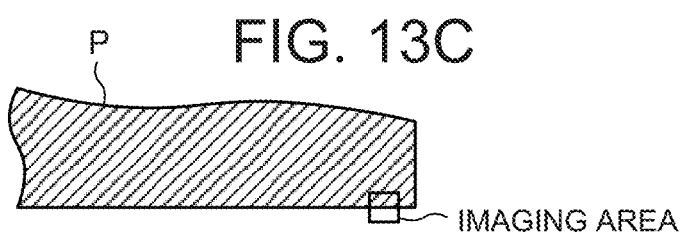

FIG. 13(a), 13(b), and 13(c) are schematic diagrams illustrating that the end of the paper sheet P in the sub-scanning direction is detected using the colorimetric camera 20. FIG. 13(a) shows the positional relationship between the paper sheet P and the colorimetric camera 20 at the time when the end of the paper sheet P in the sub-scanning direction is detected, FIG. 13(b) shows that the position of the end of the paper sheet P in the sub-scanning direction is read in the whole reading mode, and 13(c) shows that the position of the end of the paper sheet P in the sub-scanning direction is read in the partial reading mode.

To detect the end of the paper sheet P in the sub-scanning direction, the colorimetric camera 20 is fixed to, for example, the position represented in FIG. 13(a), the paper sheet P is conveyed in the sub-scanning direction, and the position of the end of the conveyed paper sheet P in the sub-scanning direction is read. As shown in FIG. 13(b), when the two-dimensional image sensor 27 is run in the whole reading mode where the imaging area is wide, the reading speed of the two-dimensional image sensor 27 is slow and the reading time is long. Accordingly, the position of the end of the paper sheet P in the sub-scanning direction is not necessarily detected accurately. The accuracy of detecting the end position improves if the speed at which the paper sheet P is conveyed is reduced; however, if the speed at which the paper sheet P is conveyed is reduced, the time required for detection extends as in the case of image misalignment detection and the performance required for the image forming apparatus 100 is not necessarily met.

On the other hand, as shown in FIG. 13(c), if the two-dimensional image sensor 27 is run in the partial reading mode where the imaging are is narrow, because the reading speed of the two-dimensional image sensor 27 is faster than that in the whole reading mode and accordingly the reading time shortens, the position of the end of the paper sheet P in the sub-scanning direction can be detected accurately. For this reason, in the embodiment, to detect the end of the paper sheet P in the sub-scanning direction using the colorimetric camera 20, the two-dimensional image sensor 27 is run in the partial reading mode.

Figure 14:
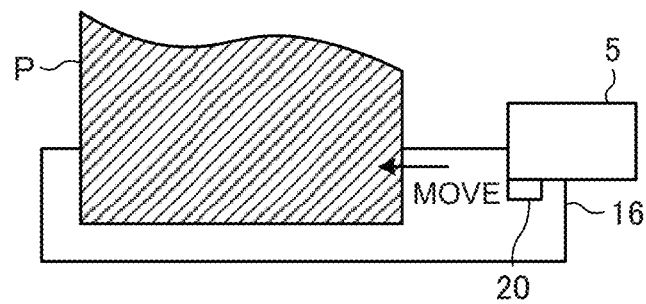
FIGS. 14(a), 14(b) and 14(c) are schematic diagrams illustrating that the end of the paper sheet in the main-scanning direction is detected using the colorimetric camera.
Figure 14B:
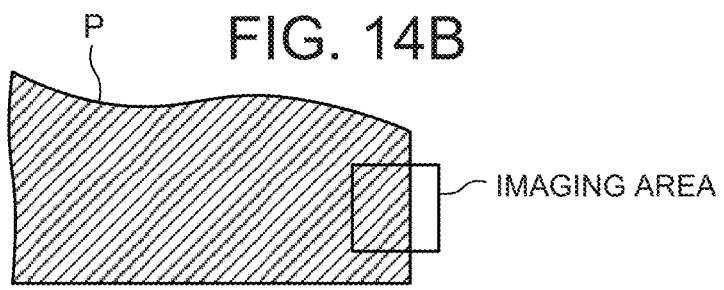
Figure 14C:
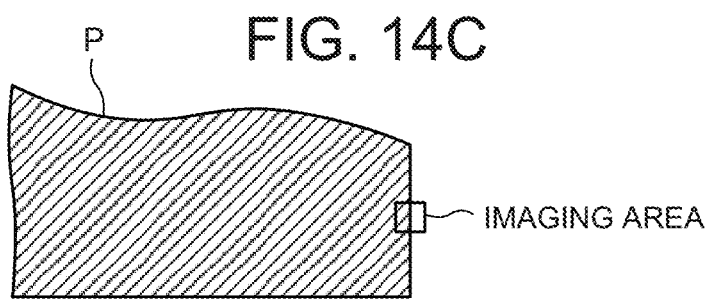

FIG. 14(a), 14(b), and 14(c) are schematic diagrams schematic diagram illustrating that the end of the paper sheet P in the main-scanning direction is detected using the colorimetric camera 20. FIG. 14(a) shows the positional relationship between the paper sheet P and the colorimetric camera 20 at the time when the end of the paper sheet P in the main-scanning direction is detected, FIG. 14(b) illustrates that the position of the end of the paper sheet P in the main-scanning direction is read in the whole reading mode, and 14(c) illustrates that the position of the end of the paper sheet P in the main-scanning direction is read in the partial reading mode.

As described above, the end of the paper sheet P in the main-scanning direction is detected in association with the operation of printing an image by ejecting ink from the recording head 6, which is mounted on the carriage 5, onto the paper sheet P. In other words, the end of the paper sheet P in the main-scanning direction is detected in the following manner as shown in FIG. 14(a): the colorimetric camera 20 is caused to move in the main scanning direction according to the moving of the carriage 5 while the conveying of the paper sheet P in the sub-scanning direction is being stopped, and the position of the end of the paper sheet P in the main-scanning direction is read by the two-dimensional image sensor 27 of the colorimetric camera 20. Here, as shown in FIG. 14 (b), when the two-dimensional image sensor 27 is run in the whole reading mode where the imaging area is wide, the reading speed of the two-dimensional image sensor 27 may be slow and the reading time is long and accordingly the position of the end of the paper sheet P in the main-scanning direction is not necessarily detected correctly. If the moving speed of the carriage 5 is reduced, the accuracy of detecting the end position improves; however, because the moving speed of the carriage 5 depends on the image printing speed, the moving speed of the carriage 5 cannot be reduced.

On the other hand, as shown in FIG. 14(c), if the two-dimensional image sensor 27 is run in the partial reading mode where the imaging area is narrow, the reading speed of the two-dimensional image sensor 27 increases and accordingly the reading time shortens. For this reason, it is possible to detect the position of the end of the paper sheet P in the main-scanning direction while moving the carriage 5 at a moving speed according to the image printing speed. Thus, in the embodiment, to detect the end of the paper sheet P in the main-scanning direction using the colorimetric camera 20, the two-dimensional image sensor 27 is run in the partial reading mode.

The following descriptions refer back to FIG. 7. The interface unit 41 is an interface for outputting image data from the two-dimensional image sensor 27 and inputting various setting signals transmitted from the CPU 101 and timing signals generated by the timing signal generator 42 to the two-dimensional image sensor 27. The various setting signals include signals for setting imaging conditions, such as the shutter speed and the AGC gain of the two-dimensional image sensor 27.

The interface unit 41 has a role of receiving a control signal specifying the operation mode of the two-dimensional image sensor 27 from the CPU 101 and passing the control signal to the sensor controller 40 (receiving unit).

The timing signal generator 42 generates a timing signal for controlling the timing at which imaging by the two-dimensional image sensor 27 starts and inputs the timing signal to the two-dimensional image sensor 27 via the interface unit 41.

The frame memory 43 temporarily stores the image data that is output from the two-dimensional image sensor 27.

The arithmetic logic unit 44 is a functional block that performs various arithmetic operations using the image data stored in the frame memory 43 and includes, according to the functions, a colorimetry arithmetic logic unit 44a, a misalignment detector 44b, and a paper sheet end detector 44c.

The colorimetry arithmetic logic unit 44a calculates RGB values of the patches 200 on which colorimetry is to be performed and RGB values of each reference patch of the reference chart 400 on the basis of the image data stored in the frame memory 43. The colorimetry arithmetic logic unit 44a calculates colorimetric values of the patches 200 on the basis of the resulting RGB values of the patches 200 and the RGB values of each reference patch of the reference chart 400. The colorimetric values calculated by the colorimetry arithmetic logic unit 44a are sent to the CPU 101. A specific example of the processing performed by the colorimetry arithmetic logic unit 44a will be described in detail below.

The misalignment detector 44b performs processing for detecting image misalignment on the basis of the image data that is output from the two-dimensional image sensor 27 running in the partial reading mode and that is stored in the frame memory 43. The paper sheet end detector 44c performs processing for detecting the sub-scanning direction end and the main-scanning direction end of the paper sheet P on the basis of the image data that is output from the two-dimensional image sensor 27 running in the partial reading mode and that is stored in the frame memory 43. Information on the image misalignment detected by the misalignment detector 44b and information on the positions of the ends of the paper sheet P detected by the paper sheet end detector 44c are sent to the CPU 101.

The non-volatile memory 45 is a storage device that stores various types of data necessary for the processing performed by the arithmetic logic unit 44.

The light source driving controller 46 generates a light source drive signal for driving the illumination light sources 30 and supplies the light source drive signal to the illumination light sources 30.

As described above, the image forming apparatus 100 according to the embodiment switches the operation mode of the two-dimensional image sensor 27 according to the purpose of using the colorimetric camera 20 and sets an imaging area according to the operation mode. Specifically, when colorimetry is performed on the patches 200 using the colorimetric camera 20, the two-dimensional image sensor 27 is run in the whole reading mode and reads output values from all the light receiving units 50 of the two-dimensional image sensor 27. On the other hand, when the colorimetric camera 20 is used for a purpose other than colorimetry, i.e., when, for example, image misalignment is detected or the end of the paper sheet P is detected using the colorimetric camera 20, the two-dimensional image sensor 27 is run in the partial reading mode and reads output values from a part of the light receiving units 50 of the two-dimensional image sensor 27. In this manner, by switching the operation mode of the two-dimensional image sensor 27 according to the purpose of using the colorimetric camera 20 and setting an imaging area according to the operation mode, the two-dimensional image sensor 27 of the colorimetric camera 20 can be used for various proposes in addition to colorimetry on the patches 200.

Method of Controlling Two-Dimensional Image Sensor

Figure 15:
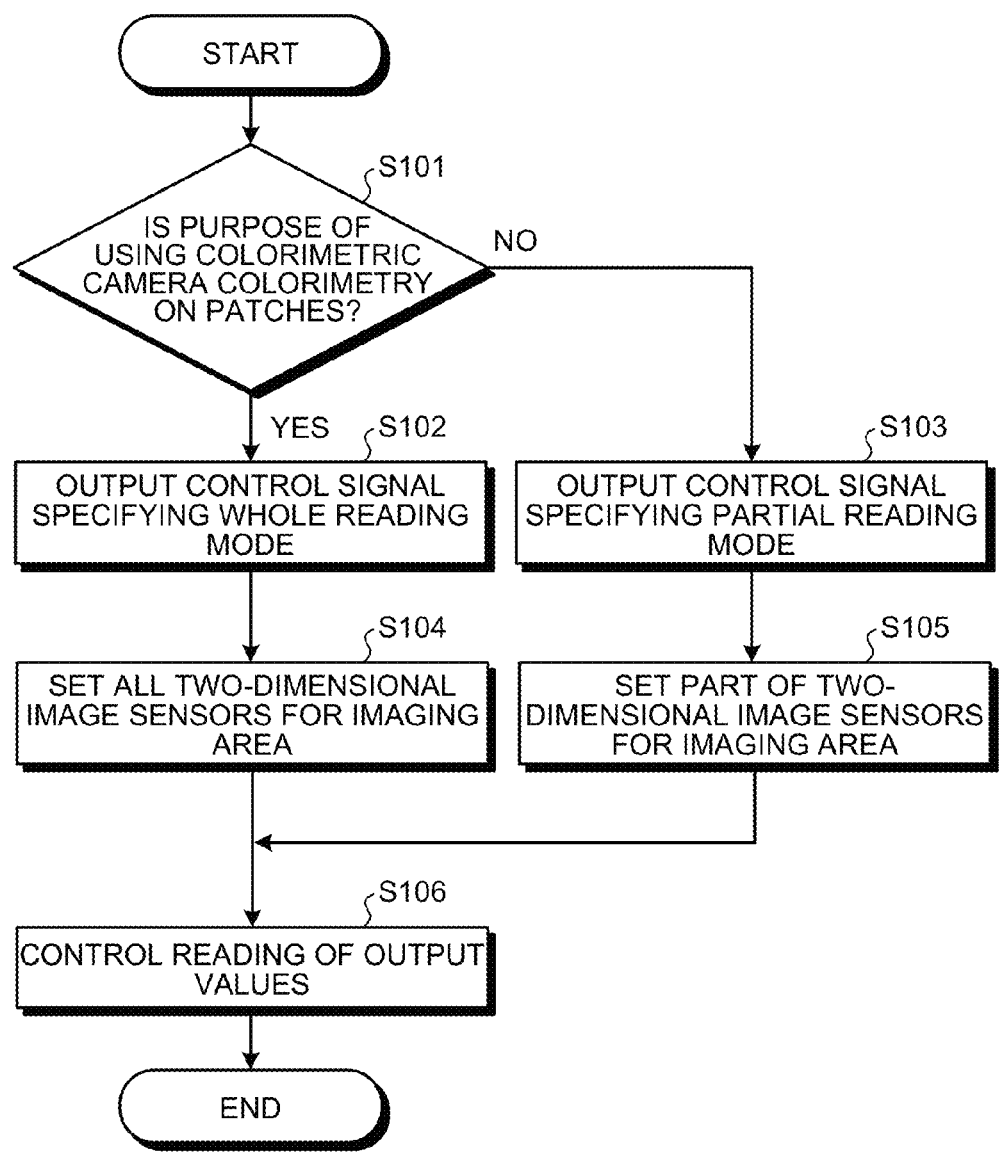
FIG. 15 is a flowchart illustrating a procedure of a method of controlling driving of the two-dimensional image sensor.

An overview of a method of controlling driving of the two-dimensional image sensor 27 according to the embodiment will be described here with reference to FIG. 15. FIG. 15 is a flowchart of a procedure of the method of controlling driving of the two-dimensional image sensor 27.

First, the CPU 101 determines whether or not the purpose of using the colorimetric camera 20 is colorimetry on the patches 200 (step S101). If the purpose of using the colorimetric camera 20 is colorimetry on the patches 200 (YES at step S101), the CPU 101 outputs a control signal specifying the whole reading mode as the operation mode of the two-dimensional image sensor 27 (step S102). On the other hand, if the purpose of using the colorimetric camera 20 is not colorimetry on the patches 200, i.e., if the purpose of using the colorimetric camera 20 is detection of image misalignment or detection of the end of the paper sheet P (NO at step S101), the CPU 101 outputs a control signal specifying the partial reading mode as the operation mode of the two-dimensional image sensor 27 (step S103). The control signal output from the CPU 101 is received by the interface unit 41 of the colorimetric camera 20 and is then passed to the sensor controller 40.

If the control signal received by the interface unit 41 is one specifying the whole reading mode, the sensor controller 40 of the colorimetric camera 20 sets all the light receiving units 50 of the two-dimensional image sensor 27 for the imaging area (step S104). On the other hand, if the control signal received by the interface unit 41 is one specifying the partial reading mode, the sensor controller 40 sets a part of the light receiving units 50 of the two-dimensional image sensor 27 for the imaging area (step S105). The sensor controller 40 controls reading of output values performed by the reading unit 53 such that output values are sequentially read from the light receiving units 50 contained in the imaging area that is set at step S104 or step S105 (step S106).

Modification

In the image forming apparatus 100 according to the embodiment, when the colorimetric camera 20 is used for a purpose requiring reading of output values of the two-dimensional image sensor 27 at high speed, the reading speed is increased by setting a narrow area for the imaging area of the two-dimensional image sensor 27. However, there is a limit on increasing the reading speed by narrowing the imaging area of the two-dimensional image sensor 27.

Particularly, with a cost-reduced sensor (a sensor where the reading speed a is small when the area ratio shown in FIG. 11 is 1), a target reading speed is not necessarily reached.

In this case, for example, regarding detection of the end of the paper sheet P, there is a risk that reading of output values does not complete while the imaging area of the two-dimensional image sensor 27 is capturing the position of the end of the paper sheet P and accordingly the end cannot be detected properly. For such a problem, it is effective to set, for the imaging area of the two-dimensional image sensor 27, an area that is long in a relative moving direction between the colorimetric camera 20 and a subject to be imaged (the paper sheet P in the embodiment).

Figure 16:
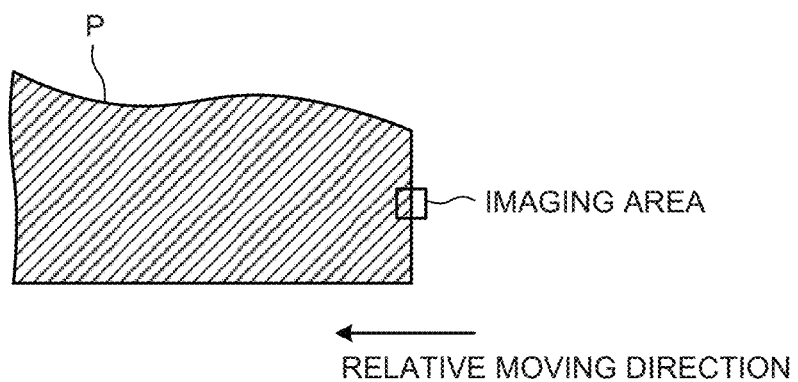
FIGS. 16(a) and 16(b) are schematic diagrams illustrating that the two-dimensional image sensor is run in a partial reading mode to detect the edge of the paper sheet in the main-scanning direction.
Figure 16B:
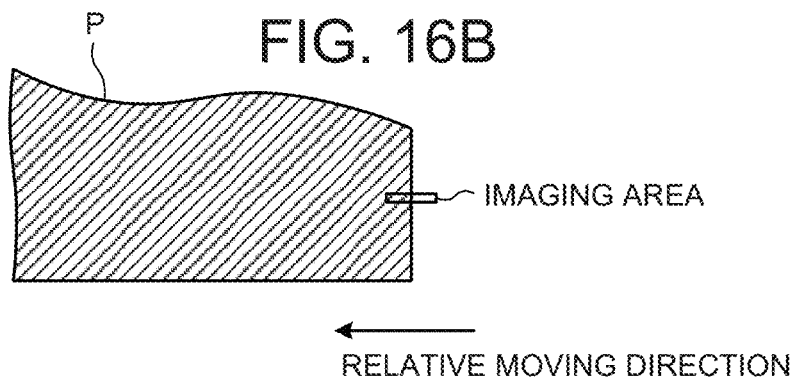

FIGS. 16(a) and 16(b) are schematic diagrams illustrating that the two-dimensional image sensor 27 is run in the partial reading mode to detect the end of the paper sheet P in the main-scanning direction. FIG. 16(a) represents the case where the imaging area of the two-dimensional image sensor 27 is a square area and FIG. 16(b) represents the case where the imaging area of the two-dimensional image sensor 27 is an area that is long in the relative moving direction.

As shown in FIG. 16(a), when a square area is set for the imaging area of the two-dimensional image sensor 27, if the reading speed is not enough, outputting of one frame is not necessarily complete while the imaging area is capturing the position of the end of the paper sheet P and accordingly the end of the paper sheet P is not necessarily detected.

On the other hand, as shown in FIG. 16(b), when an area that is long in the relative moving direction is set for the imaging area of the two-dimensional image sensor 27, the time during which the imaging area is capturing the paper sheet P extends. Accordingly, even at the same reading speed, outputting of one frame can complete while the imaging area is capturing the position of the end of the paper sheet P and accordingly the end of the paper sheet P can be detected properly.

Figure 17A:
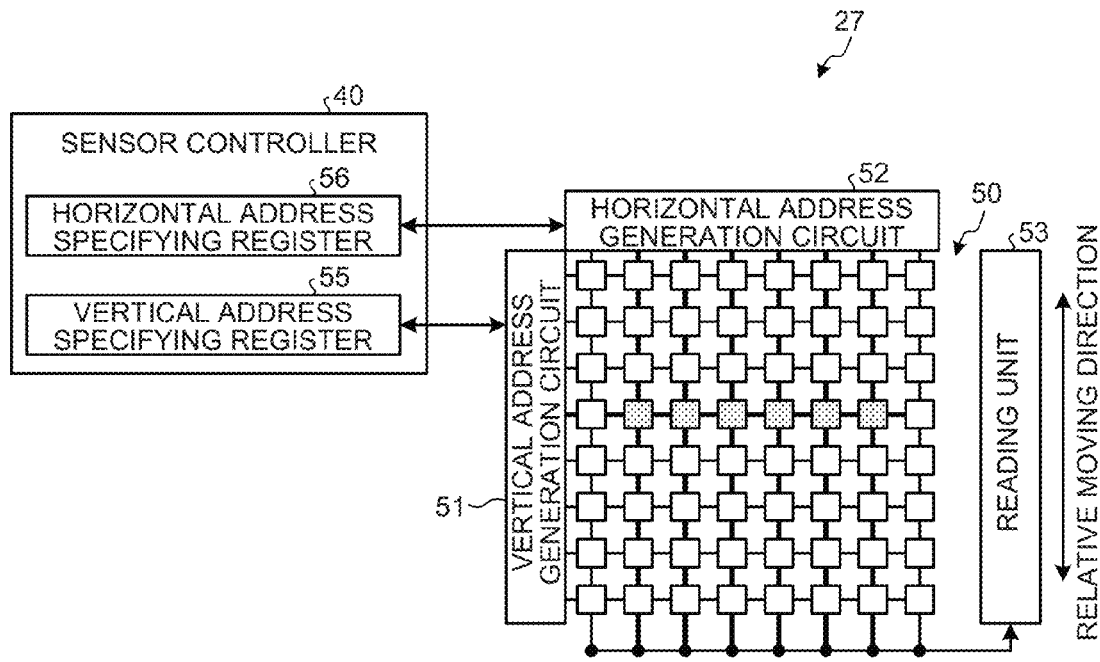
FIGS. 17(a) and 17(b) are schematic diagrams illustrating that an area that is long in a relative moving direction is set for the imaging area of the two-dimensional image sensor.
Figure 17B:
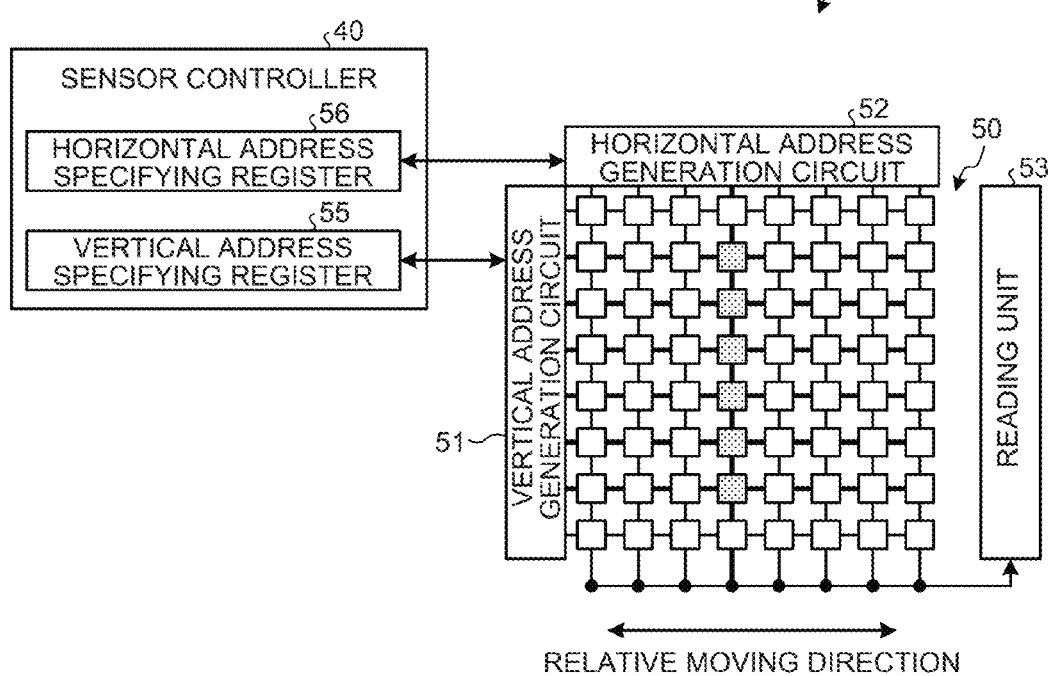

FIG. 17(a) and 17(b) are schematic diagrams illustrating that an area that is long in the relative moving direction is set for the imaging area of the two-dimensional image sensor 27. FIG. 17(a) represents a case where the relative moving direction is the main-scanning direction and FIG. 17(b) represents a case where the relative moving direction is the sub-scanning direction.

When the two-dimensional image sensor 27 is run in the partial reading mode, the sensor controller 40 confirms whether the direction in which the colorimetric camera 20 moves relatively to a subject to be imaged (the paper sheet P in the embodiment) is the main-scanning direction or the sub-scanning direction. If the relative moving direction is the main-scanning direction, the sensor controller 40 stores the addresses of the light receiving units 50 of the two-dimensional image sensor 27 that are arrayed horizontally in the vertical address specifying register 55 and the horizontal address specifying register 56 and accordingly, as shown in FIG. 17(a), sets an area long in the main-scanning direction for the imaging area to control reading of output values performed by the reading unit 53. On the other hand, if the relative moving direction is the sub-scanning direction, the sensor controller 40 stores the addresses of the light receiving units 50 of the two-dimensional image sensor 27 that are arrayed vertically in the vertical address specifying register 55 and the horizontal address specifying register 56 and accordingly, as shown in FIG. 17(b), sets an area long in the sub-scanning direction for the imaging area to control reading of output values performed by the reading unit 53.

Figure 18:
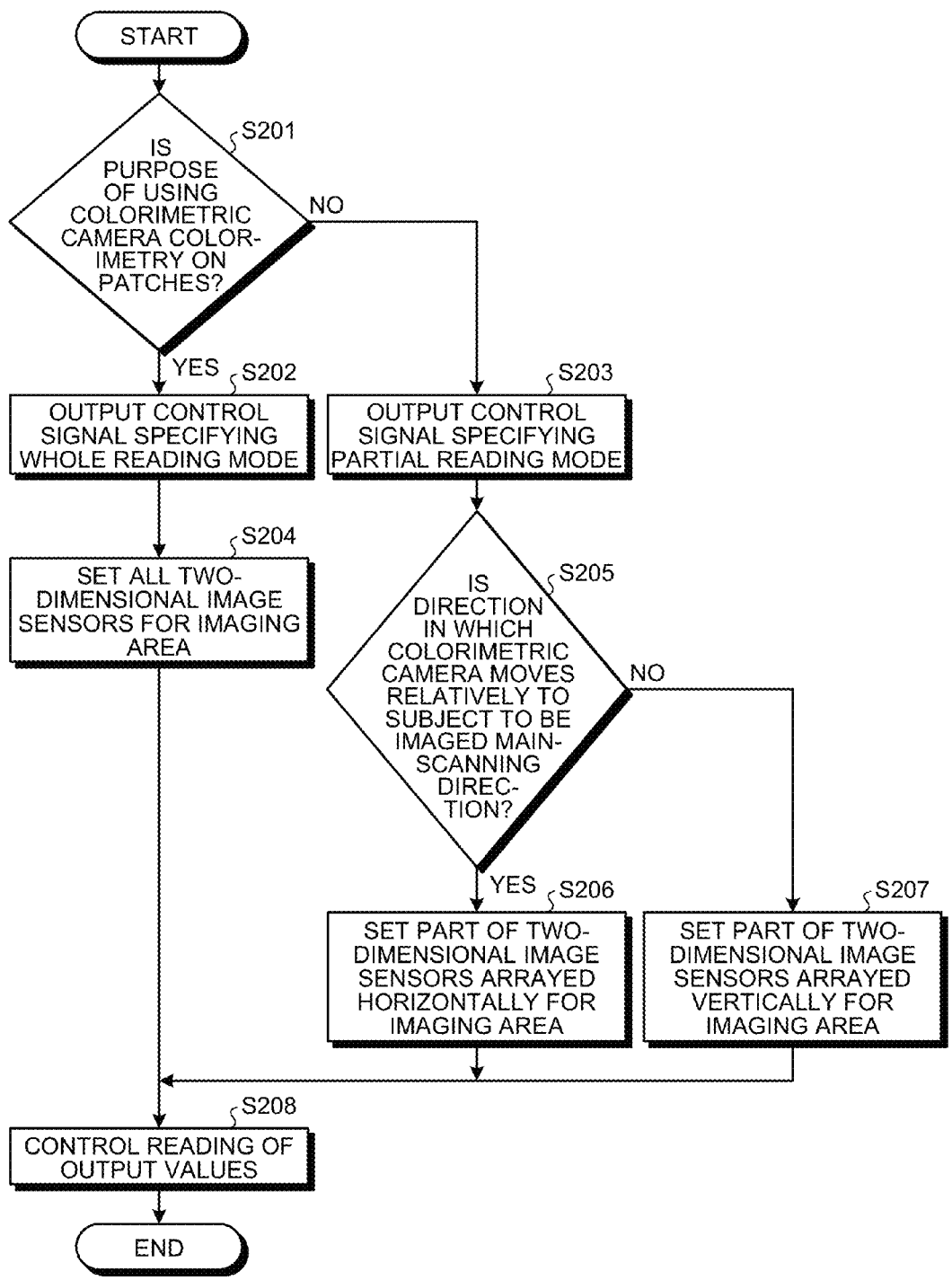
FIG. 18 is a flowchart illustrating a procedure of a method of controlling driving of the two-dimensional image sensor according to a modification.

FIG. 18 is a flowchart of a procedure of controlling driving of the two-dimensional image sensor 27 according to a modification.

First, the CPU 101 determines whether or not the purpose of using the colorimetric camera 20 is colorimetry on the patches 200 (step S201). If the purpose of using the colorimetric camera 20 is colorimetry on the patches 200 (YES at step S201), the CPU 101 outputs a control signal specifying the whole reading mode as the operation mode of the two-dimensional image sensor 27 (step S202). On the other hand, if the purpose of using the colorimetric camera 20 is not colorimetry on the patches 200, i.e., if the purpose of using the colorimetric camera 20 is detection of image misalignment or detection of the end of the paper sheet P (NO at step S201), the CPU 101 outputs a control signal specifying the partial reading mode as the operation mode of the two-dimensional image sensor 27 (step S203). The control signal output from the CPU 101 is received by the interface unit 41 of the colorimetric camera 20 and is then passed to the sensor controller 40.

If the control signal received by the interface unit 41 is one specifying the whole reading mode, the sensor controller 40 of the colorimetric camera 20 sets all the light receiving units 50 of the two-dimensional image sensor 27 for the imaging area (step S204). On the other hand, if the control signal received by the interface unit 41 is one specifying the partial reading mode, the sensor controller 40 determines whether or not the direction in which the colorimetric camera 20 moves relatively to a subject to be imaged (the paper sheet P in the embodiment) is the main-scanning direction (step S205).

If the relative moving direction is the main-scanning direction (YES at step S205), the sensor controller 40 sets a part of the light receiving units 50 of the two-dimensional image sensor 27 that are arrayed horizontally (corresponding to the main-scanning direction) for the imaging area (step S206). On the other hand, if the relative moving direction is the sub-scanning direction (NO at step S205), the sensor controller 40 sets a part of the light receiving units 50 of the two-dimensional image sensor 27 that are arrayed vertically (corresponding to the sub-scanning direction) for the imaging area (step S207).

The sensor controller 40 controls reading of output values performed by the reading unit 53 such that output values are sequentially read from the light receiving units 50 contained in the imaging area that is set at step S204, step S206, or step S207 (step S208).

Specific Example of Colorimetry on Patches

A specific example of a method of performing colorimetry on the patches 200 performed by the image forming apparatus 100 according to the embodiment will be described in detail here with reference to FIGS. 19 to 25. The colorimetric method described below includes a pre-processing that is performed when the image forming apparatus 100 is in a default state (in a default state after manufactured or overhauled) and colorimetric processing that is performed upon color calibration where color calibration on the image forming apparatus 100 is performed.

Figure 19:
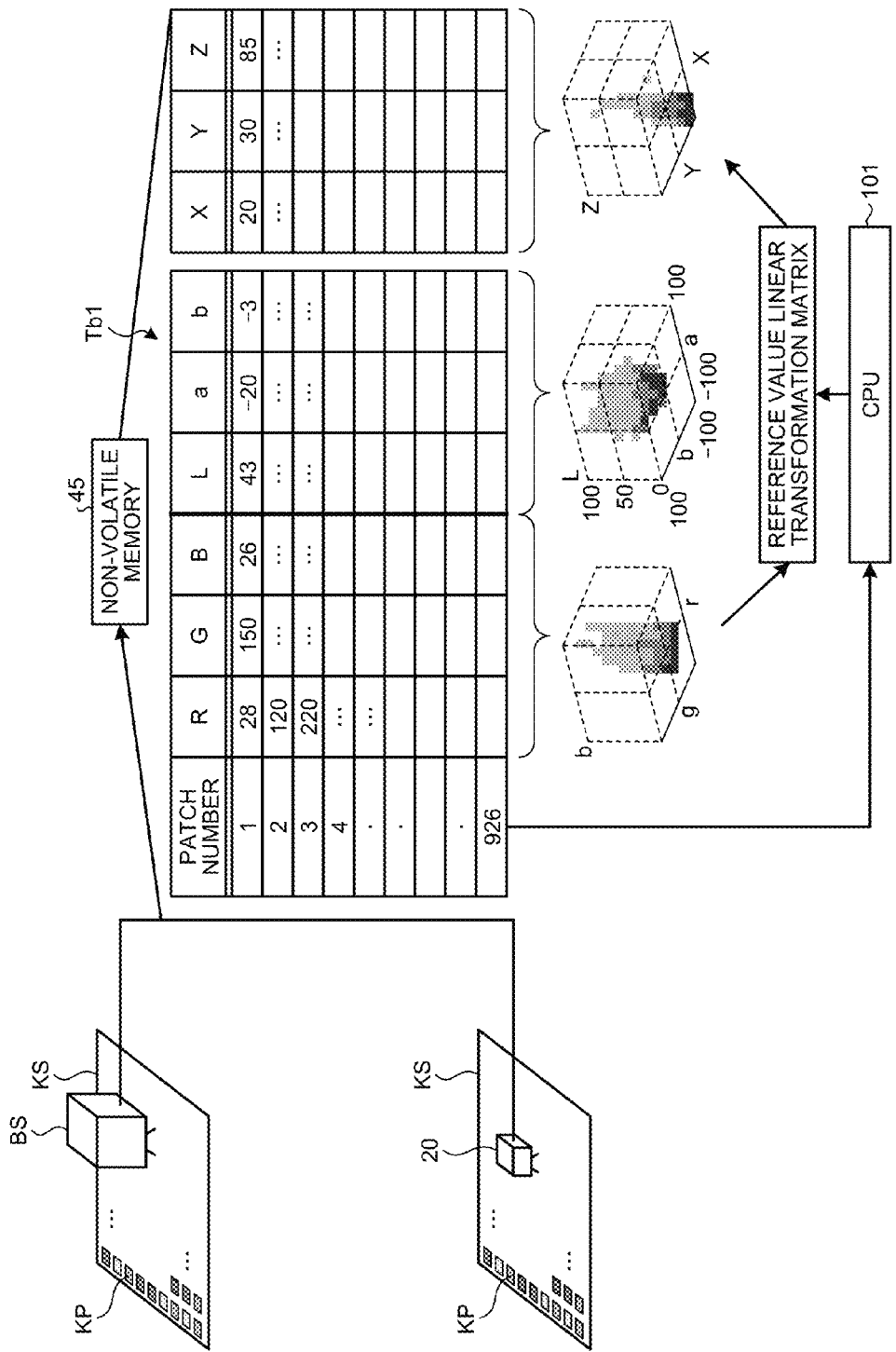
FIG. 19 is a diagram illustrating processing for acquiring reference colorimetric values and reference RGB values and processing for generating a reference value liner transformation matrix.

FIG. 19 illustrates processing for acquiring reference colorimetric values and reference RGB values and a processing for generating a reference value linear transformation matrix. The processing shown in FIG. 19 is performed as the pre-processing. In the pre-processing, a reference sheet KS is used on which multiple reference patches KP are formed in an arrayed manner. The reference patches KP on the reference sheet KS are equivalent to the patches of the reference chart 400 of the colorimetric camera 20.

At least the Lab values that are the colorimetric values of the multiple reference patches KP of the reference sheet KS or the XYZ values (in the example shown in FIG. 19, both the Lab values and XYZ values) are stored in association with the patch numbers, respectively in, for example, a memory table Tb1 that is provided to the non-volatile memory 45 that is mounted on the substrate 22 of the colorimetric camera 20. The colorimetric values of the reference patches KP are values previously obtained by colorimetry using a spectrometer BS, etc. If the colorimetric values of the reference patches KP are known, the colorimetric values may be used. The colorimetric values of the reference patches KP stored in the memory table Tb1 are referred to as "reference colorimetric values" below.

The reference sheet KS is set on the platen 16 and the colorimetric camera 20 images a subject, i.e., the multiple reference patches KP of the reference sheet KS, by controlling moving of the carriage 5. The RGB values of the reference patches KP obtained by imaging performed by the colorimetric camera 20 are stored in the memory table Tb1 of the non-volatile memory 45 in association with the patch numbers. In other words, the memory table Tb1 stores the colorimetric values and the RGB values of the multiple reference patches KP, which are formed and in an arrayed manner on the reference sheet KS, in association with the patch numbers. The RGB values of the reference patches KP stored in the memory table Tb1 are referred to as "reference RGB values". The reference RGB values reflect characteristics of the colorimetric camera 20.

Once the reference colorimetric values and the reference RGB values of the reference patches KP are stored in the memory table Tb1 of the non-volatile memory 45, the CPU 101 of the image forming apparatus 100 generates, for the pair of the XYZ values that are the reference colorimetric values and the reference RGB values of the same patch number, a reference value liner transformation matrix for intertransformation between the XYZ value and the reference RGB values and stores the reference value liner transformation matrix in the non-volatile memory 45. If only Lab values are stores as the reference colorimetric values in the memory table Tb1, it suffices if a reference value linear transformation matrix is generated after the Lab values are transformed into XYZ values using a known transformation formula to transform Lab values into XYZ values.

Figures 20A, 20B:
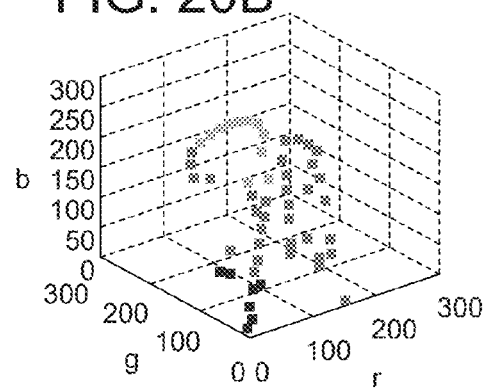
FIGS. 20(a) and 20(b) are diagrams illustrating exemplary default reference RGB values.

When the colorimetric camera 20 images multiple reference patches KP of the reference sheet KS, the reference chart 400 provided to the colorimetric camera 20 is imaged as well. The RGB values of each patch of the reference chart 400 acquired by this imaging are also stored in the memory table Tb1 of the non-volatile memory 45 in association with the patch number. The RGB values of the patches of the reference chart 400 stored in the memory table Tb1 by the pre-processing are referred to as "default reference RGB values". FIG. 20(a) and 20(b) show exemplary default reference RGB values. FIG. 20(a) represents that default reference RGB values (RdGdBd) are stored in the memory table Tb1 and that, in association with the default reference RGB values (RdGdBd), default reference Lab values (Ldadbd) into which the default reference RGB values (RdGdBd) are transformed and default reference XYZ values (XdYdZd) into which the default reference RGB values (RdGdBd) are transformed are stored. FIG. 20(b) is a scatter plot where default reference RGB values of each patch of the reference chart 400 are plotted.

After the pre-processing ends, on the basis of image data and printing settings that are input from the outside and under the control of the CPU 101, the image forming apparatus 100 drives the main scanning motor 8, the sub scanning motor 12, and the recording head 6 to, while intermittently conveying the paper sheet P in the sub-scanning direction, cause the recording head 6 to eject ink to print an image onto the paper sheet P. Here, the volume of ink to be ejected from the recording head 6 may vary according to the characteristics unique to the apparatus, changes over time, etc., and, if the volume of ink to be ejected varies, an image in colors different from those intended by the user is formed, i.e., color reproducibility degrades. For this reason, the image forming apparatus 100 performs colorimetric processing where colorimetric values of the patches 200 contained in the test chart printed on the paper sheet P at a given timing at which color calibration is performed. A device profile is generated or corrected on the basis of the colorimetric values of the patches 200 obtained by the colorimetric processing and color calibration is performed according to the device profile to enhance color reproducibility of the output image.

Figure 21:
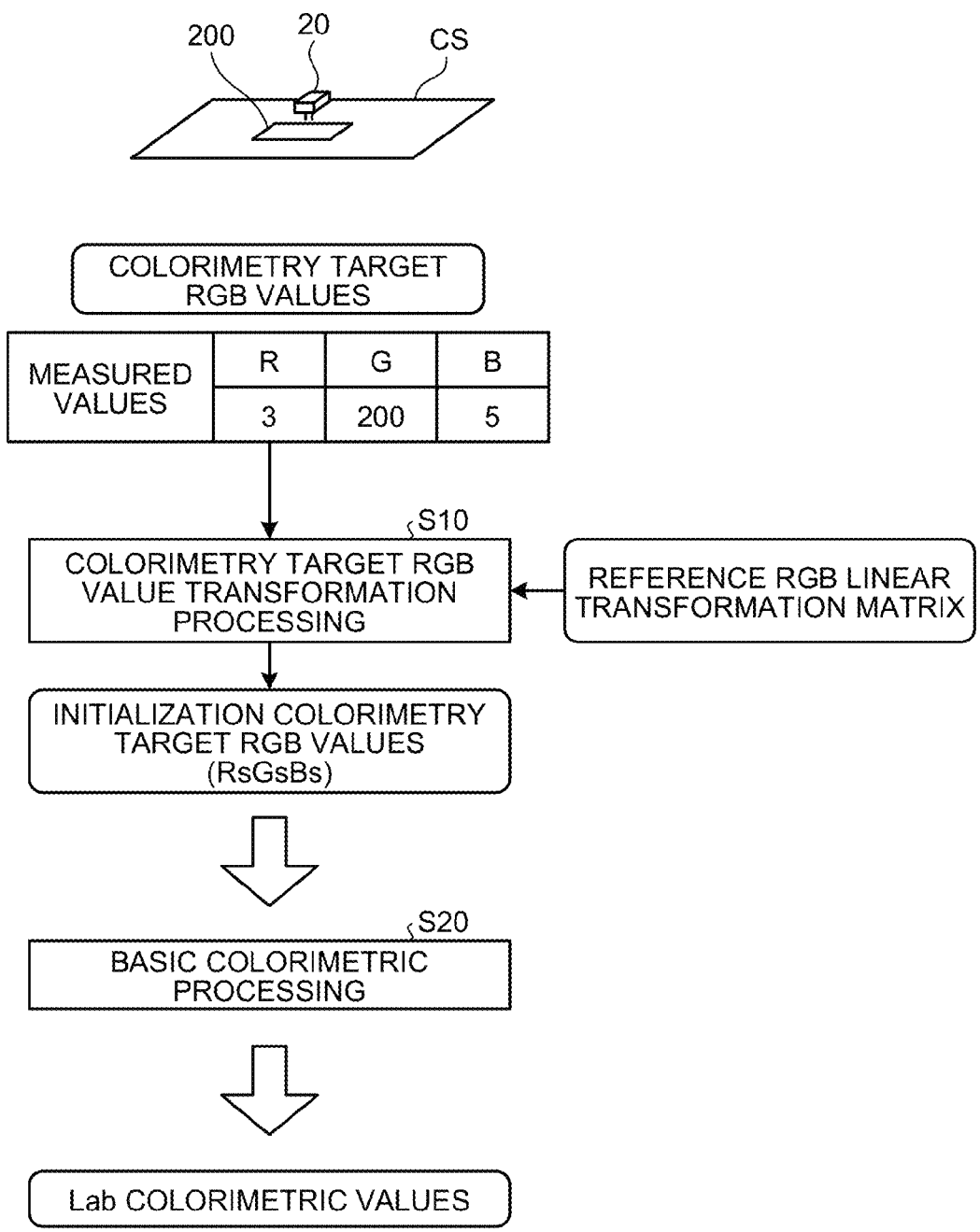
FIG. 21 is a diagram illustrating an overview of colorimetric processing.

FIG. 21 illustrates an overview of the colorimetric processing. To perform color calibration, the image forming apparatus 100 ejects ink from the recording head 6 onto the paper sheet P that is set on the platen 16 to print a test pattern where a large number of patches 200 are arrayed. The paper sheet P on which the test pattern is printed is referred to as an "adjustment sheet CS". On the adjustment sheet CS, the patches 200 reflecting the output characteristics, particularly, the output characteristics of the recording head 6 upon color calibration on the image forming apparatus 100 are printed. The image data for printing the test pattern is previously stored in the non-volatile memory 45, etc.

As shown in FIG. 21, using the two-dimensional image sensor 27 of the colorimetric camera 20, the image forming apparatus 100 captures an image while moving the carriage 5 in the main-scanning direction above the adjustment sheet CS in a state where the adjustment sheet CS is set on the platen 16 or the adjustment sheet CS is hold on the platen 16 without being ejected upon being created. From the captured image that is output from the two-dimensional image sensor 27, the RGB values of the patches 200 are calculated. Because the two-dimensional image sensor 27 images the reference chart 400 simultaneously with the patches 200 on which colorimetry is to be performed, the RGB values of each reference patch contained in the reference chart 400 are obtained as well. The RGB values of the patches 200 on which colorimetry is to be performed are referred to as "colorimetry target RGB values" and the RGB values of the reference patches of the reference chart 400 are referred to as "colorimetry reference RGB values (RdsGdsBds)". The "colorimetry reference RGB values (RdsGdsBds)" are stored in the non-volatile memory 45 etc.

The colorimetry arithmetic logic unit 44a of the colorimetric camera 20 performs processing for transforming the colorimetry target RGB values into initialization colorimetry target RGB values (RsGsBs) using a reference RGB linear transformation matrix to be described below (step S10). The initialization RGB linear transformation matrix (RsGsBs) are obtained by excluding, from the colorimetry target RGB values, effects of changes of the colorimetric camera 20 over time, e.g., changes of the illumination light sources 30 over time and changes of the two-dimensional image sensor 27 over time, occurring during the period from the default state where the pre-processing is performed to color calibration where the colorimetric processing is performed.

The colorimetry arithmetic logic unit 44a acquires the Lab values that are colorimetric values of the patches 200 on which colorimetry is to be performed by performing basic colorimetric processing, which will be described below, on the initialization colorimetry target RGB values (RsGsBs) into which the colorimetry target RGB values are transformed (step S20).

Figure 22:
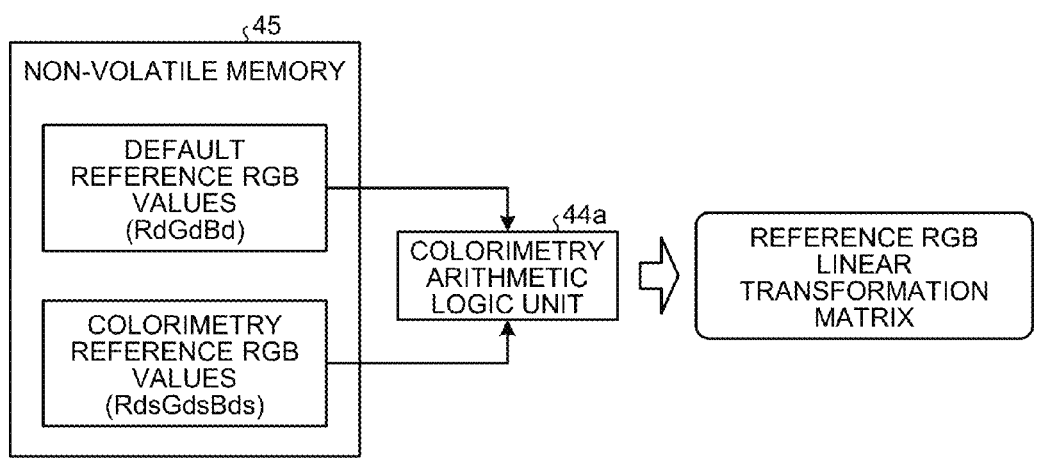
FIG. 22 is a diagram illustrating processing for generating a reference RGB linear transformation matrix.

FIG. 22 illustrates processing for generating a reference RGB linear transformation matrix. FIG. 23(a) and 23(b) are diagrams representing the relationship between the default reference RGB values and the colorimetry reference RGB values. Before performing processing for transforming the colorimetry target RGB values into default colorimetry target RGB values (RsGsBs) (step S10), the colorimetry arithmetic logic unit 44a generates a reference RGB linear transformation matrix used for the transformation. In other words, as shown in FIG. 22, the colorimetry arithmetic logic unit 44a reads, from the non-volatile memory 45, the default reference RGB values (RdGdBd) obtained in the pre-processing when the image forming apparatus 100 is in the default state and the colorimetry reference RGB values (RdsGdsBds) obtained upon color calibration and generates the reference RGB linear transformation matrix for converting the colorimetry reference RGB values RdsGdsBds into default reference RGB values RdGdBd. The colorimetry arithmetic logic unit 44a stores the generated reference RGB linear transformation matrix in the non-volatile memory 45.

The light dots shown in FIG. 23(a) are points at which the default reference RGB values RdGdBd are plotted in the rgb space and the filled dots are points at which the colorimetry reference RGB values RdsGds Bds are plotted in the rgb space. As it is understood from FIG. 23(a), the values of the colorimetry reference RGB values RdsGdsBds vary from the values of the default reference RGB values RdGdBd and the directions in which the values vary in the rgb space are approximately uniform as shown in FIG. 23(b) but the direction of shift differs depending on the hue. As described above, the cause of the variation of the RGB values that occurs even when the patches of the same reference chart 400 are imaged includes the changes of the illumination light sources 30 over time and changes of the two-dimensional image sensor 27 over time.

As described above, if, in the state where the RGB values obtained by imaging with the colorimetric camera 20 vary, colorimetric values are calculated using the colorimetry target RGB values that are obtained by imaging the patches 200, there is a risk that errors occur in the colorimetric values according to the variation. For this reason, the reference RGB liner transformation matrix for transforming the colorimetry reference RGB values RdsGdsBds into the default reference RGB values RdGdBd is calculated using an estimation method, such as a least squares method, between the default reference RGB values RdGdBd and the colorimetry reference RGB values RdsGdsBds, the colorimetry target RGB values obtained by imaging the patches 200 using the colorimetric camera 20 are transformed into the initialization colorimetry target RGB values RsGsBs by using the reference RGB liner transformation matrix, and basic colorimetry processing to be described below is performed on the initialization colorimetry target RGB values RsGsBs, which makes it possible to accurately acquire the colorimetric values of the patches 200 on which colorimetry is to be performed.

The reference RGB linear transformation matrix may be not only primary transformation matrix but also a transformation matrix of a higher order and, if the non-linearity is high between the rgb space and the XYZ space, a matrix of a higher order is used, which improves the transformation accuracy.

As described above, after transforming the colorimetry target RGB values into the initialization colorimetry target RGB values (RsGsBs) using the reference RGB linear transformation matrix (step S10), the colorimetry arithmetic logic unit 44a performs the basic colorimetric processing at step S20 on the initialization colorimetry target RGB values (RsGsBs).

FIGS. 24 and 25 are diagrams illustrating the basic colorimetric processing. First, the colorimetry arithmetic logic unit 44a reads the reference value linear transformation matrix that is generated in the pre-processing and stored in the non-volatile memory 45, transforms the initialization colorimetry target RGB values (RsGsBs) into first XYZ values using the reference value linear transformation matrix, and stores the first XYZ values in the non-volatile memory 45 (step S21). FIG. 24 illustrates an example where the initialization colorimetry target RGB values (3, 200, 5) are transformed into first XYZ values (20, 80, 10) using the reference value linearly transformation matrix.

The colorimetry arithmetic logic unit 44a transforms the first XYZ values, which are transformed from the initialization colorimetry target RGB values (RsGsBs), into first Lab values using a known transformation formula and stores the first Lab values in the non-volatile memory 45 (step S22). FIG. 24 illustrates an example where the first XYZ values (20, 80, 10) are transformed into first Lab values (75, −60, 8) using a known transformation formula.

The colorimetry arithmetic logic unit 44a searches multiple sets of reference colorimetric values (Lab values) stored in the memory table Tb1 of the non-volatile memory 45 in the pre-processing and selects, from among the reference colorimetric values (Lab values), a set of multiple patches (close-color patches) having reference colorimetric values (Lab values) close in distance to the first Lab values in a Lab space (step S23). For a method of selecting patches close in distance, for example, a method can be used in which, for all reference colorimetric values (Lab values) stored in the memory table Tb1, each distance to the first Lab values is calculated and multiple patches having Lab values close in distance to the first Lab values (the hatched Lab values shown in FIG. 24) are selected.

As shown in FIG. 25, the colorimetry arithmetic logic unit 44a then refers to the memory table Tb1 and, for each of the close-color patches selected at step S23, RGB values (reference RGB values) and XYZ values corresponding to the Lab values are retrieved and, from among the multiple sets of RGB values and XYZ values, a combination of RGB values and XYZ values is selected (step S24). Using a least squares method, etc., the colorimetry arithmetic logic unit 44a then calculates a selection RGB value linear transformation matrix for transforming the RGB values of the selected combination (selected set) into XYZ values and stores the calculated selection RGB value linear transformation matrix in the non-volatile memory 45 (step S25).

The colorimetry arithmetic logic unit 44a then transforms the initialization colorimetry target RGB values (RsGsBs) into second XYZ values using the selection RGB value linear transformation matrix calculated at step S25 (step S26). The colorimetry arithmetic logic unit 44a then transforms the second XYZ values calculated at step S26 into second Lab values using a known transformation formula (step S27) and uses the resulting second Lab values as final colorimetric values of the target patches 200 on which colorimetry is to be performed. The image forming apparatus 100 generates or corrects a device profile on the basis of the colorimetric values obtained in the above-described colorimetric processing and performs color calibration according to the device profile, which enhances color reproducibility of the output image.

In the above-described colorimetric camera 20 has the configuration in which the reference chart 400 is provided to the housing 23 and the two-dimensional image sensor 27 of the sensor unit 26 simultaneously images the patches 200 on which colorimetry is to be performed and the reference chart 400. However, as described above, the default reference RGB values and the colorimetric reference RGB values obtained by imaging the reference chart 400 are used to, from the colorimetry target RGB values obtained by imaging the patches 200 on which colorimetry is to be performed, exclude the effects of changes of the illumination light sources 30 over time and changes of the two-dimensional image sensor 27 over time. In other words, the default reference RGB values and the colorimetry reference RGB values obtained by imaging the reference chart 400 are used to calculate the above-descried reference RGB linear transformation matrix and, using the reference RGB linear transformation matrix, transform the colorimetry target RGB values into the initialization RGB values (RsGsBs).

Accordingly, if the changes of the imaging conditions on the colorimetric camera 20 over time are at a level where it can be ignored with respect to the required colorimetric accuracy, the colorimetric camera 20 without the reference chart 400 may be used to calculate colorimetric values of the patches 200. In such a case, the processing for transforming the colorimetry target RGB values into the initialization colorimetry target RGB values (step S10 in FIG. 21) is omitted and the basic colorimetric processing is performed on the colorimetry target RGB values (step S20 in FIG. 21 and FIGS. 24 and 25).

As described above using the specific example above, in the image forming apparatus 100 according to the embodiment, when the colorimetric camera 20 is used to perform colorimetry on the patches 200, the two-dimensional image sensor 27 of the colorimetric camera 20 is run in the whole reading mode. On the other hand, when the colorimetric camera 20 is used for a use other than colorimetry on the patches 200, for example, for detection of image misalignment or detection of the end of the paper sheet P, the two-dimensional image sensor 27 is run in the partial reading mode. When the two-dimensional image sensor 27 is run in the partial reading mode, an area narrower than that in the whole reading mode is set for the imaging area of the two-dimensional image sensor 27, which increases the speed at which output values are read from the two-dimensional image sensor 27. In this manner, in the image forming apparatus 100 according to the embodiment, the two-dimensional image sensor 27 of the colorimetric camera 20 that is difficult to use in the conventional method due to its insufficient reading speed can be efficiently used for various uses.

For example, in the above-described embodiment, when image misalignment is detected or the end of the paper sheet P is detected using the colorimetric camera 20, the two-dimensional image sensor 27 is run in the partial reading mode; however, alternatively, when implementing some function other than colorimetry on the patches 200 using the colorimetric camera 20, the imaging area of the two-dimensional image sensor 27 may be narrowed compared to the case where colorimetry is performing on the patches 200, which increases the reading speed.

The methods of performing colorimetry on the patches 200, detecting image misalignment, and detecting the end of the paper sheet P are an example only. Alternatively, for the method of performing colorimetry on the patches 200, the method disclosed in Japanese Laid-open Patent Publication No. 2012-63270 may be used instead of the above-described method.

According to the embodiment, the two-dimensional image sensor can be used efficiently for more uses.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus comprising:
an image sensor that includes a two-dimensional array of light receiving units each capable of reading an output value according to a volume of received light that is reflected from a subject;
a motor that moves the subject and the image sensor relatively;
a first controller that controls switching between a first mode having a first relative speed between the subject and the image sensor and a second mode having a second relative speed between the subject and the image sensor, the first relative speed being smaller than the second relative speed;
a second controller that changes an area of the two-dimensional array of light receiving units actively reading so as to increase a number of active light receiving units in the first mode in comparison with a number of active light receiving units in the second mode; and
a third controller that sets a relative speed between the subject and the image sensor based on which one of the first mode and the second mode is switched to active by the first controller.

2. The apparatus according to claim 1, wherein,
the image sensor is attached to a printer carriage of an image forming apparatus; and
the second controller changes the area of the two-dimensional array of light receiving units actively reading in response to a determination that an operation mode of the motor is edge detection of a recording medium.

3. The apparatus according to claim 2, wherein,
the second controller changes the area to have a larger number of light receiving units which correspond with a main scanning direction of the carriage than in a sub-scanning direction in response to a determination that an operation mode of the motor is edge detection during a relative movement between the carriage and the recording medium in the main scanning direction.

4. The apparatus according to claim 2, wherein,
the second controller changes the area to have a larger number of light receiving units which correspond with a sub-scanning direction of the carriage than in a main scanning direction in response to a determination that an operation mode of the motor is edge detection during a relative movement between the carriage and the recording medium in the sub-scanning direction.

5. The apparatus according to claim 1, wherein,
the second controller changes the area in response to a determination that an operation mode of the motor is misalignment detection of a pattern printed on a recording medium.

6. The apparatus according to claim 1, wherein,
the second controller reads output values from the area during performance of an operation mode carried out by the motor.

7. The apparatus according to claim 1, wherein,
the second controller is configured to monitor each of the light receiving units in the image sensor in response to a determination that an operation mode of the motor is colorimetry for an image forming apparatus.

8. The apparatus according to claim 1, wherein,
in response to a determination that an operation mode of the motor is a position detecting mode, the second controller changes the area to be long in a direction in which the image sensor moves relatively to the printing medium on which the image is printed.

9. An image forming apparatus comprising:
a printing unit that prints an image on a printing medium;
an image sensor that includes a two-dimensional array of light receiving units each capable of reading an output value according to a volume of received light that is reflected from a printing medium;
a motor that moves the printing medium and the image sensor relatively;
a first controller that controls switching between a first mode having a first relative speed between the subject and the image sensor and a second mode having a second relative speed between the subject and the image sensor, the first relative speed being smaller than the second relative speed;
a second controller that changes an area of the two-dimensional array of light receiving units actively reading so as to increase a number of active light receiving units in the first mode in comparison with a number of active light receiving units in the second mode; and
a third controller that sets a relative speed between the subject and the image sensor based on which one of the first mode and the second mode is switched to active by the first controller.

10. The apparatus according to claim 9, wherein,
the third controller sets the relative speed based on which one of a coloristic mode that performs colorimetry or color calibration of an image printed on the printing medium and a position detecting mode that detects a position with respect to the printing medium is active by the first controller.

11. A method comprising:
moving, with a motor, a subject and an image sensor relatively, wherein the image sensor includes a two-dimensional array of light receiving units each capable of reading an output value according to a volume of received light that is reflected from the subject;
controlling switching between a first mode having a first relative speed between the subject and the image sensor and a second mode having a second relative speed between the subject and the image sensor, the first relative speed being smaller than the second relative speed;
changing an area of the two-dimensional array of light receiving units actively reading so as to increase a number of active light receiving units in the first mode in comparison with a number of active light receiving units in the second mode; and
setting a relative speed between the subject and the image sensor based on which one of the first mode and the second mode is switched.

* * * * *